US011559941B2

(12) United States Patent
Aswathanarayanaswamy et al.

(10) Patent No.: US 11,559,941 B2
(45) Date of Patent: Jan. 24, 2023

(54) SELECTIVE LASER SOLIDIFICATION APPARATUS AND METHOD

(71) Applicant: RENISHAW PLC, Wotton-under-Edge (GB)

(72) Inventors: Ravi Aswathanarayanaswamy, Stone (GB); Marc Thomas Berkeley Saunders, Birdlip (GB)

(73) Assignee: RENISHAW PLC, Wotton-under-Edge (GB)

( * ) Notice: Subject to any disclaimer, the term of this patent is extended or adjusted under 35 U.S.C. 154(b) by 0 days.

(21) Appl. No.: 17/046,537

(22) PCT Filed: Apr. 29, 2019

(86) PCT No.: PCT/GB2019/051182
§ 371 (c)(1),
(2) Date: Oct. 9, 2020

(87) PCT Pub. No.: WO2019/211587
PCT Pub. Date: Nov. 7, 2019

(65) Prior Publication Data
US 2021/0031446 A1    Feb. 4, 2021

(30) Foreign Application Priority Data

Apr. 30, 2018    (GB) ..................................... 1806987
Aug. 13, 2018    (GB) ..................................... 1813157

(51) Int. Cl.
*B29C 64/393*    (2017.01)
*B29C 64/153*    (2017.01)
(Continued)

(52) U.S. Cl.
CPC .......... *B29C 64/153* (2017.08); *B29C 64/255* (2017.08); *B29C 64/268* (2017.08);
(Continued)

(58) Field of Classification Search
CPC ... B29C 64/153; B29C 64/255; B29C 64/393; B29C 64/268; B29C 64/264; B33Y 10/00; B33Y 30/00; B33Y 50/02
See application file for complete search history.

(56) References Cited

U.S. PATENT DOCUMENTS 10,343,216 B2    7/2019  Domrose et al.
2016/0114432 A1  4/2016  Ferrar et al.
(Continued)

FOREIGN PATENT DOCUMENTS

EP    2 786 858 A1    10/2014
EP    3 272 505 A1    1/2018
(Continued)

OTHER PUBLICATIONS

Ahmad Bin Anwar et al. "Spatter transport by inert gas flow in selective laser melting: A simulation study", Powder Technology—Electrostatic phenomena in particulate processes, vol. 352, Apr. 19, 2019, pp. 103-116, XP0559901, Basel, ISSN: 0032-5910, DOI: 10.1016/j.powtech. 2019.04.044.
Jul. 4, 2019 International Search Report issued in International Patent Application No. PCT/GB2019/051182.
Jul. 4, 2019 Written Opinion issued in International Patent Application No. PCT/GB2019/051182.
(Continued)

*Primary Examiner* — Joseph S Del Sole
*Assistant Examiner* — Jamel M Nelson
(74) *Attorney, Agent, or Firm* — Oliff PLC

(57) ABSTRACT

A method of selecting a scanning sequence of a laser beam in a selective laser solidification process, in which one or more objects are formed layer-by-layer by, repeatedly, depositing a layer of powder on a powder bed and scanning a plurality of laser beams over the deposited powder to selectively solidify the powder layers, wherein a gas flow is passed over the powder bed in a gas flow direction. The method including selecting a scanning sequence for the plurality of laser beams to include the simultaneous exposure of an upstream point together with a downstream point (Continued)

located downstream of a flow of debris carried from the upstream point by the gas flow, the downstream and upstream points selected for simultaneous exposure based upon the downstream point being within a maximum separation distance from the upstream point.

6 Claims, 33 Drawing Sheets

(51) Int. Cl.
  *B33Y 10/00*    (2015.01)
  *B33Y 30/00*    (2015.01)
  *B33Y 50/02*    (2015.01)
  *B29C 64/255*    (2017.01)
  *B29C 64/268*    (2017.01)

(52) U.S. Cl.
  CPC ............ *B29C 64/393* (2017.08); *B33Y 10/00* (2014.12); *B33Y 30/00* (2014.12); *B33Y 50/02* (2014.12)

(56) References Cited

U.S. PATENT DOCUMENTS

2017/0189961 A1* 7/2017 Ferrar .................... B29C 64/20
2018/0215095 A1* 8/2018 Amaya ................ B29C 64/264
2018/0290241 A1* 10/2018 Mcclelland ........... B29C 64/135

FOREIGN PATENT DOCUMENTS

| | | |
|---|---|---|
| JP | 2018-126985 A | 8/2018 |
| WO | 2010/007396 A1 | 1/2010 |
| WO | 2014/125258 A2 | 8/2014 |
| WO | 2014/125280 A2 | 8/2014 |
| WO | 2014/154878 A1 | 10/2014 |
| WO | 2018/118436 A1 | 6/2018 |

OTHER PUBLICATIONS

Oct. 15, 2018 British Search Report issued in British Application No. 1806987.2.

\* cited by examiner

All the fracture surfaces (downstream, upstream and standalone) looked the same

| | Modulus [GPa] | 0.2% Offset yield [MPa] | UTS [MPa] | Elongation [%] | Reduction of area [%] |
|---|---|---|---|---|---|
| V01 | > 172 | > 567 | > 854 | > 41.9 | > 26.7 |
| V02 | > 162 | > 567 | > 876 | > 60.6 | > 52.0 |
| V03 | > 166 | > 568 | > 875 | > 62.0 | > 53.4 |
| V04 | > 182 | > 574 | > 884 | > 59.2 | > 54.1 |
| V05 | > 171 | > 561 | > 849 | > 42.7 | > 27.6 |
| V06 | > 183 | > 571 | > 877 | > 61.4 | > 56.3 |
| V07 | > 170 | > 563 | > 870 | > 61.5 | > 56.2 |
| V08 | > 174 | > 574 | > 881 | > 61.6 | > 52.7 |
| V09 | > 165 | > 559 | > 827 | > 32.4 | > 22.9 |
| V10 | > 189 | > 580 | > 876 | > 61.0 | > 57.8 |
| V11 | > 174 | > 566 | > 875 | > 60.9 | > 53.3 |
| V12 | > 174 | > 577 | > 879 | > 61.1 | > 59.1 |
| V13 | > 167 | > 566 | > 866 | > 48.2 | > 31.6 |
| V14 | > 160 | > 570 | > 883 | > 61.1 | > 47.8 |
| V15 | > 175 | > 569 | > 878 | > 61.4 | > 55.5 |
| V16 | > 165 | > 566 | > 880 | > 60.1 | > 54.7 |
| Average | 172 | 569 | 871 | 56 | 48 |
| StDev | 8 | 6 | 15 | 9 | 13 |

| | Modulus [GPa] | 0.2% Offset yield [MPa] | UTS [MPa] | Elongation [%] | Reduction of area [%] |
|---|---|---|---|---|---|
| 1 | > 176 | > 585 | > 894 | > 61.1 | > 59.1 |
| 2 | > 170 | > 582 | > 890 | > 61.9 | > 49.7 |
| 3 | > 167 | > 575 | > 878 | > 60.7 | > 56.6 |
| 4 | > 172 | > 574 | > 877 | > 60.9 | > 58.3 |
| 5 | > 173 | > 585 | > 893 | > 59.1 | > 52.2 |
| 6 | > 176 | > 589 | > 898 | > 62.1 | > 55.6 |
| 7 | > 180 | > 585 | > 892 | > 61.8 | > 53.1 |
| 8 | > 181 | > 591 | > 891 | > 61.4 | > 59.2 |
| 9 | > 201 | > 596 | > 908 | > 61.9 | > 52.2 |
| 10 | > 178 | > 587 | > 894 | > 61.9 | > 59.2 |
| 11 | > 171 | > 586 | > 893 | > 61.7 | > 57.0 |
| 12 | > 178 | > 581 | > 885 | > 61.3 | > 55.6 |
| 13 | > 185 | > 585 | > 888 | > 60.9 | > 57.4 |
| 14 | > 177 | > 593 | > 902 | > 61.4 | > 55.9 |
| 15 | > 169 | > 585 | > 891 | > 60.3 | > 44.9 |
| 16 | > 183 | > 593 | > 896 | > 60.9 | > 48.7 |
| Average | 177 | 586 | 892 | 61.2 | 54.7 |
| StDev | 8.3 | 6.1 | 7.7 | 0.8 | 4.2 |

Melting order 1, 2, 3
and 4, 13, 14, 15 and
16, 17, 18, 19 and 20.
5, 6, 7 and 8, 21, 22,
23 and 24.
9, 10, 11 and 12

| Young's Modulus (GPa) | 0.2% PS (MPa) | UTS (MPa) | Elong. (%) | R of A (%) | Sample ID | Spacing between upstream to downstream | Spacing between downstream samples (centre to centre) | Cone Angle | Elong. (%) |
|---|---|---|---|---|---|---|---|---|---|
| 114 | 965 | 1090 | 17.0 | 53.0 | 1 | 180 | 15 | 5 | -3.5 |
| 110 | 965 | 1090 | 12.5 | 30.0 | 2 | 180 | 0 | 0 | -8.0 |
| 112 | 960 | 1080 | 15.5 | 43.0 | 3 | 180 | -15 | -5 | -5.0 |
| 108 | 950 | 1080 | 20.5 | 60.0 | 4 | 180 | | | 2.0 |
| 111 | 970 | 1090 | 19.0 | 59.0 | 5 | 110 | 15 | 8 | -1.5 |
| 111 | 965 | 1080 | 15.5 | 46.0 | 6 | 110 | 0 | 0 | -0.5 |
| 111 | 960 | 1080 | 16.5 | 50.0 | 7 | 110 | -15 | -8 | |
| 109 | 955 | 1080 | 17.0 | 60.0 | 8 | 110 | | | 1.5 |
| 112 | 955 | 1080 | 18.5 | 60.0 | 9 | 40 | 15 | 21 | -1.5 |
| 112 | 960 | 1080 | 15.5 | 52.0 | 10 | 40 | 0 | 0 | 0.5 |
| 114 | 955 | 1080 | 17.5 | 60.0 | 11 | 40 | -15 | -21 | |
| 111 | 950 | 1080 | 17.0 | 59.0 | 12 | 40 | | | -2.5 |
| 111 | 960 | 1080 | 15.0 | 46.0 | 13 | 180 | 30 | 9 | -2.5 |
| 114 | 955 | 1080 | 15.0 | 43.0 | 14 | 180 | 0 | 0 | -1.0 |
| 114 | 955 | 1080 | 16.5 | 55.0 | 15 | 180 | -30 | -9 | |
| 109 | 940 | 1070 | 17.5 | 57.0 | 16 | 180 | | | -4.5 |
| 111 | 960 | 1080 | 13.5 | 36.0 | 17 | 180 | 20 | 6 | -1.5 |
| 110 | 955 | 1080 | 16.5 | 51.0 | 18 | 180 | 0 | 0 | -2.0 |
| 112 | 960 | 1080 | 16.0 | 51.0 | 19 | 180 | -20 | -6 | |
| 110 | 950 | 1080 | 18.0 | 58.0 | 20 | 180 | | | 1.0 |
| 113 | 955 | 1080 | 18.0 | 58.0 | 21 | 110 | 20 | 10 | 0.0 |
| 111 | 955 | 1080 | 17.0 | 56.0 | 22 | 110 | 0 | 0 | 1.0 |
| 112 | 950 | 1080 | 18.0 | 58.0 | 23 | 110 | -20 | 10 | |
| 111 | 950 | 1070 | 17.0 | 55.0 | 24 | 110 | | | |

FIG. 25c

Elongation vs X and Y distance

X displacement

| Y displacement (mm) | 180 | 145 | 110 | 75 | 40 |
|---|---|---|---|---|---|
| 35 | | | | | |
| 30 | -2.5 | | | | |
| 25 | | | | | |
| 20 | -4.5 | | 1.0 | | |
| 15 | -3.5 | | 2.0 | | 1.5 |
| 10 | | | | | |
| 5 | | | | | |
| 0 | -8.0 | | -1.5 | | -1.5 |
| -5 | | | | | |
| -10 | | | | | |
| -15 | -5.0 | | -0.5 | | 0.5 |
| -20 | -2.0 | | 1.0 | | |
| -25 | | | | | |
| -30 | -1.0 | | | | |
| -35 | | | | | |

FIG. 25d

Elongation vs X distance and cone angle

X displacement

| Cone angle (°) | 180 | 145 | 110 | 75 | 40 |
|---|---|---|---|---|---|
| 21 | | | | | 1.5 |
| 18 | | | | | |
| 15 | | | | | |
| 12 | | | 1.0 | | |
| 9 | -2.5 | | 2.0 | | |
| 6 | -4.5 | | | | |
| 3 | -3.5 | | | | |
| 0 | -8.0 | | -1.5 | | -1.5 |
| -3 | -5.0 | | | | |
| -6 | -2.0 | | | | |
| -9 | -1.0 | | 1.0 | | |
| -12 | | | 1.0 | | |
| -15 | | | | | |
| -18 | | | | | |
| -21 | | | | | 0.5 |

FIG. 25e

SELECTIVE LASER SOLIDIFICATION APPARATUS AND METHOD

FIELD OF INVENTION

The present invention relates to selective laser solidification and in particular to an improved selective laser melting process and apparatus utilizing a plurality of laser beams.

BACKGROUND

Additive manufacturing or rapid prototyping methods for producing objects comprise layer-by-layer solidification of a material, such as a metal powder material, using a laser beam. A powder layer is deposited on a powder bed in a build chamber and a laser beam is scanned across portions of the powder layer that correspond to a cross-section of the object being constructed. The laser beam melts or sinters the powder to form a solidified layer. After selective solidification of a layer, the powder bed is lowered by a thickness of the newly solidified layer and a further layer of powder is spread over the surface and solidified, as required. In a single build, more than one object can be built, the objects spaced apart in the powder bed.

During the melting or sintering process, debris (e.g. condensate, unsolidified particles of powder etc) is produced within the build chamber. It is known to introduce a gas flow through the build chamber in an attempt to remove debris from the chamber in the gas flow. For example, the M280 model of machine produced by EOS GmbH, Munich, Germany comprises a series of gas outlet nozzles located to the rear of the powder bed that pass a flow of gas to a series of exhaust vents that are located at the front of the powder bed. In this manner, a planar layer of gas flow is created at the surface of the powder bed. A similar arrangement is provided in Renishaw's RenAM 500Q machine (with gas flow form side-to-side), which melts selected areas of the powder bed using four independently steerable laser beams. WO2014/125258 A2, WO2014/125280 A2, WO2014/154878 A1 and EP2786858 A1 disclose methods wherein a scanning strategy for a laser beam is based upon a direction of a gas flow through the build chamber. At least in WO2014/125258 A2, WO2014/125280 A2 and WO2014/154878 A1 it is taught to process the powder bed in a direction opposed to the gas flow direction.

SUMMARY OF INVENTION

According to a first aspect of the invention there is provided a method of selecting a scanning sequence for a plurality of laser beams in a selective laser solidification process, in which one or more objects are formed layer-by-layer by repeatedly depositing a layer of powder on a powder bed and scanning the plurality of laser beams over the deposited powder to selectively solidify the powder layers, wherein a gas flow is passed over the powder bed in a gas flow direction, the method comprising selecting a scanning sequence for the plurality of laser beams to include the simultaneous exposure of an upstream point together with a downstream point located downstream of a flow of debris carried from the upstream point by the gas flow.

The downstream and upstream points may be selected for simultaneous exposure based upon the downstream point being within a maximum separation distance from the upstream point.

It has been found that, in a multi-laser beam process, such as that carried out in the RenAM 500Q, when a downstream point on the powder bed is exposed simultaneously with an upstream point and is within a maximum separation distance, the quality of the solidified downstream point is substantially unaffected by the gas-borne debris generated by the exposure of the upstream point. Outside of these acceptable boundaries, the simultaneous processing of the two points on the powder bed can affect the quality of the solidified downstream point. Partially freeing a/the processor to select the scanning strategy to include the simultaneous processing of certain downstream points can allow for a reduction in non-utilisation periods of the laser beams.

The maximum separation distance may be a function of a material being melted, laser power, scan speed, point distance and exposure time, laser spot size, an area of an upstream area being solidified, a number of upstream points that are simultaneously exposed to the laser beams, a hatch angle relative to the direction of gas flow and/or an angle between a line joining the downstream and upstream points and the gas flow direction. It has been found that the quality of solidification is affected by the relative positions of the downstream and upstream points that are simultaneously exposed to the laser beams. Surprisingly, it has been found that the closer the two points are together, the less the downstream point is affected by the simultaneous processing of the upstream point.

The maximum separation distance would be less that a width of the powder bed in the gas flow direction and typically, would be between a few millimetres to a few hundreds of millimetres.

A downstream point is a point that is within or deemed to be within a stream of debris generated by the solidification of the upstream point. The term "downwind point" as used herein is a point further along in the direction of gas flow whether or not it falls within or is deemed to fall within the debris produced by the solidification of an upwind point.

The downstream point may be a point within a gas-borne debris zone. The gas-borne debris zone may be a zone of the powder bed across which gas-borne debris generated by the solidification of the upstream point is deemed to be carried by the gas flow. The gas-borne debris zone may be determined based upon the location of the upstream point.

The selection of the scanning sequence may be based upon the downstream point being outside of a prohibited region of the gas-borne debris zone. The prohibited region may be a function of a location of the upstream point in the powder bed, a type of material being melted, laser power, scan speed, point distance and exposure time, laser spot size, an area of an upstream region to be solidified, a number of upstream points that are simultaneously exposed to the laser beams together the with downstream point, a distance between the downstream and upstream point and/or an angle between a line joining the downstream and upstream points and the gas flow direction.

The scanning sequence may be selected based upon, for each layer, the relative locations of the upstream and downstream points, the relative locations of upstream and downstream hatch lines (vectors) or hatch line segments, the relative locations of upstream and downstream stripes or stripe segments and/or the relative locations of upstream and downstream islands or island segments to be solidified. The maximum separation distance may be applied to one or each of these scan elements that define the scan such that simultaneously exposed points of the scanning sequence including a downstream point located downstream in the direction of gas flow of an upstream point are spatially arranged to be within the maximum separation distance.

Grouping of the exposure points into larger scan elements, such as hatch lines or hatch line segments, stripes or stripe segments or islands or island segments, and considering the relative spatial arrangement of these larger scan elements may simplify and/or speed-up the process of selecting the scanning sequence.

Often, for each powder layer, the area to be solidified may comprise a plurality of separate islands, rather than a single large area. The selection of the scanning sequence of the laser beams may comprise determining which islands can be simultaneously scanned based upon a relative position of the islands in the gas flow direction. If the islands are within the maximum separation distance of each other in the gas flow direction, the exposure points defined by the islands can be simultaneously exposed to the laser beams.

The selective solidification of an area of a powder layer may be performed by dividing the area to be scanned into a plurality of stripes or stripe segments (so called "stripe scanning"). The laser scanner rapidly moves (e.g. scans or steps) a laser spot across a stripe or stripe segment to form a plurality of parallel hatch lines. For each stripe, the hatch lines are typically scanned in a stripe formation direction. However, the stripe formation direction may be different (i.e. perpendicular) for different stripes within the same layer. The stripes may extend across the width of an area to be solidified or may be spilt into smaller stripe segments, such as squares in a chequerboard pattern. Such a scanning strategy can ensure that the majority of hatch lines have an equal length (i.e. a length equal to a width of the stripe). The selection of the scanning sequence of the laser beams may comprise determining which stripes or stripe segments can be simultaneously scanned based upon a relative position of the stripes or stripe segments in the gas flow direction. If the stripes or stripe segments are within the maximum separation distance of each other in the gas flow direction, the exposure points defined by the stripes or stripe segments can be simultaneously exposed to the laser beams.

In another method of selective solidification of an area of a powder layer, the laser scanner moves the laser spots along hatch lines that extend across an entire width of the area to be solidified (so called "meander scanning"). With meander scanning, the lengths of the hatch lines are predominantly determined by the geometry of the island(s) corresponding to the area to be solidified.

For either stripe scanning or meander scanning, the selection of the scanning sequence of the laser beams may comprise determining which hatch lines or hatch line segments can be simultaneously scanned based upon a relative position of the hatch lines or hatch line segments in the gas flow direction. If the hatch lines or hatch line segments are within the maximum separation distance of each other in the gas flow direction, exposure points defined by the hatch lines or hatch line segments can be simultaneously exposed to the laser beams.

The scanning sequence may comprise a core scan for solidifying a core of an area to be solidified, the core scan comprising a plurality of hatch lines, for example of a stripe or meander scanning strategy, and a border scan for solidifying a border of the area, the border scan having a path that follows a perimeter of the area. The method may comprise selecting points of the border scan for simultaneous exposure with points of the core scan such that downstream and upstream points selected for simultaneous exposure are within the maximum separation distance.

The method may be a computer-implemented method.

According to a second aspect of the invention there is provided a data carrier having instructions stored thereon, the instructions, when executed by a processor, cause the processor to carry out the method of the first aspect of the invention.

The data carrier of the above aspects of the invention may be a suitable medium for providing a machine with instructions such as non-transient data carrier, for example a floppy disk, a CD ROM, a DVD ROM/RAM (including -R/-RW and +R/+RW), an HD DVD, a BIu Ray™ disc, a memory (such as a Memory Stick™, an SD card, a compact flash card, or the like), a disc drive (such as a hard disk drive), a tape, any magneto/optical storage, or a transient data carrier, such as a signal on a wire or fibre optic or a wireless signal, for example a signal sent over a wired or wireless network (such as an Internet download, an FTP transfer, or the like).

According to a third aspect of the invention there is provided apparatus comprising a processor, the processor arranged to carry out the method of the first aspect of the invention.

According to a fourth aspect of the invention there is provided a selective laser solidification apparatus comprising a powder bed onto which a powder layer can be deposited, a gas flow unit for passing a flow of gas over the powder bed along a gas flow direction, at least one laser scanner for independently scanning each laser beam of a plurality of laser beams over the powder layer and a processor arranged to control the at least one laser scanner to expose points on the powder bed to the laser beams in a scanning sequence to selectively solidify the powder layer at the points to form one or more objects. The scanning sequence may have been determined in accordance with the method of the first aspect of the invention.

According to a fifth aspect of the invention there is provided a selective laser solidification method comprising; forming a plurality of powder layers of a powder bed, scanning each laser beam of a plurality of laser beams over the powder layers in a scanning sequence to solidify selected areas of each powder layer to form one or more objects whilst passing a flow of gas over the powder bed along a gas flow direction. The scanning sequence may have been determined in accordance with the method of the first aspect of the invention.

According to a sixth aspect of the invention there is provided a selective laser solidification apparatus comprising a powder bed onto which a powder layer can be deposited, a gas flow unit for passing a flow of gas over the powder bed along a gas flow direction, at least one laser scanner for independently scanning each laser beam of a plurality of laser beams over the powder layer and a processor arranged to control the at least one laser scanner to expose points on the powder bed to the laser beams in a scanning sequence to selectively solidify the powder layer at the points to form one or more objects. The scanning sequence may be such that, preferably all, downstream points exposed simultaneously with a corresponding upstream point, which generates debris that is carried over the downstream point by the gas flow, are spatially arranged to be within a maximum separation distance of the corresponding upstream point.

According to a seventh aspect of the invention there is provided a selective laser solidification method comprising; forming a plurality of powder layers of a powder bed, scanning each laser beam of a plurality of laser beams over the powder layers in a scanning sequence to solidify selected areas of each powder layer to form one or more objects whilst passing a flow of gas over the powder bed along a gas flow direction. The scanning sequence may be such that, preferably all, downstream points exposed simultaneously with a corresponding upstream point, which generates debris that is carried over the downstream point by the gas flow, are spatially arranged to be within a maximum separation distance of the corresponding upstream point.

DESCRIPTION OF THE DRAWINGS

Embodiments of the invention will now be described, as examples only, with reference to the accompanying drawings, in which:—

FIG. 25*c* shows the measured mechanical properties of the test cylinders of the seventh experimental build; FIG. 25*d* shows the measure of elongation at break versus X and Y distance and FIG. 25*e* shows the measure of elongation at break versus cone angle.

DESCRIPTION OF EMBODIMENTS

Figure 1:
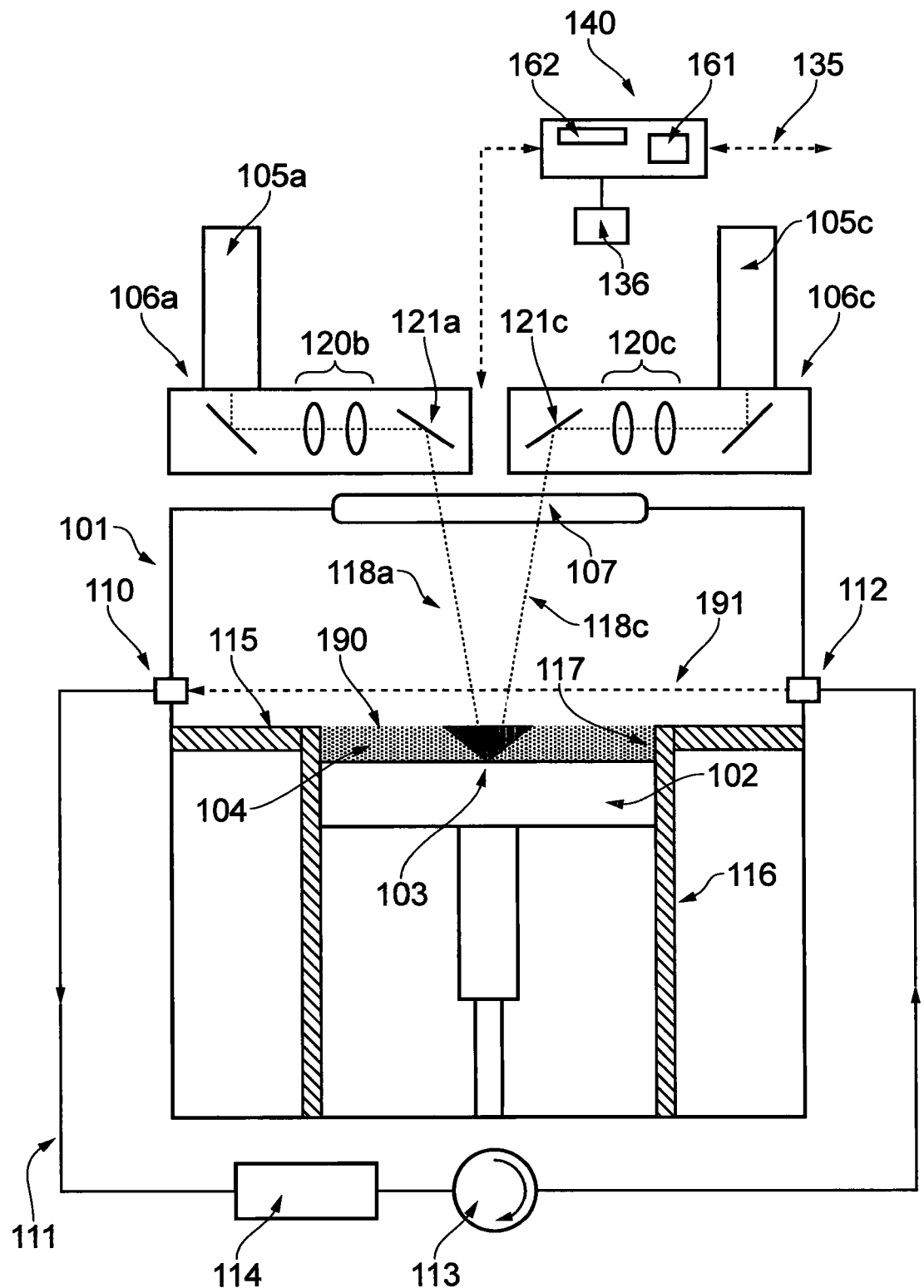
FIG. 1 is a schematic view of a laser solidification apparatus according to one embodiment of the invention.
Figure 2:
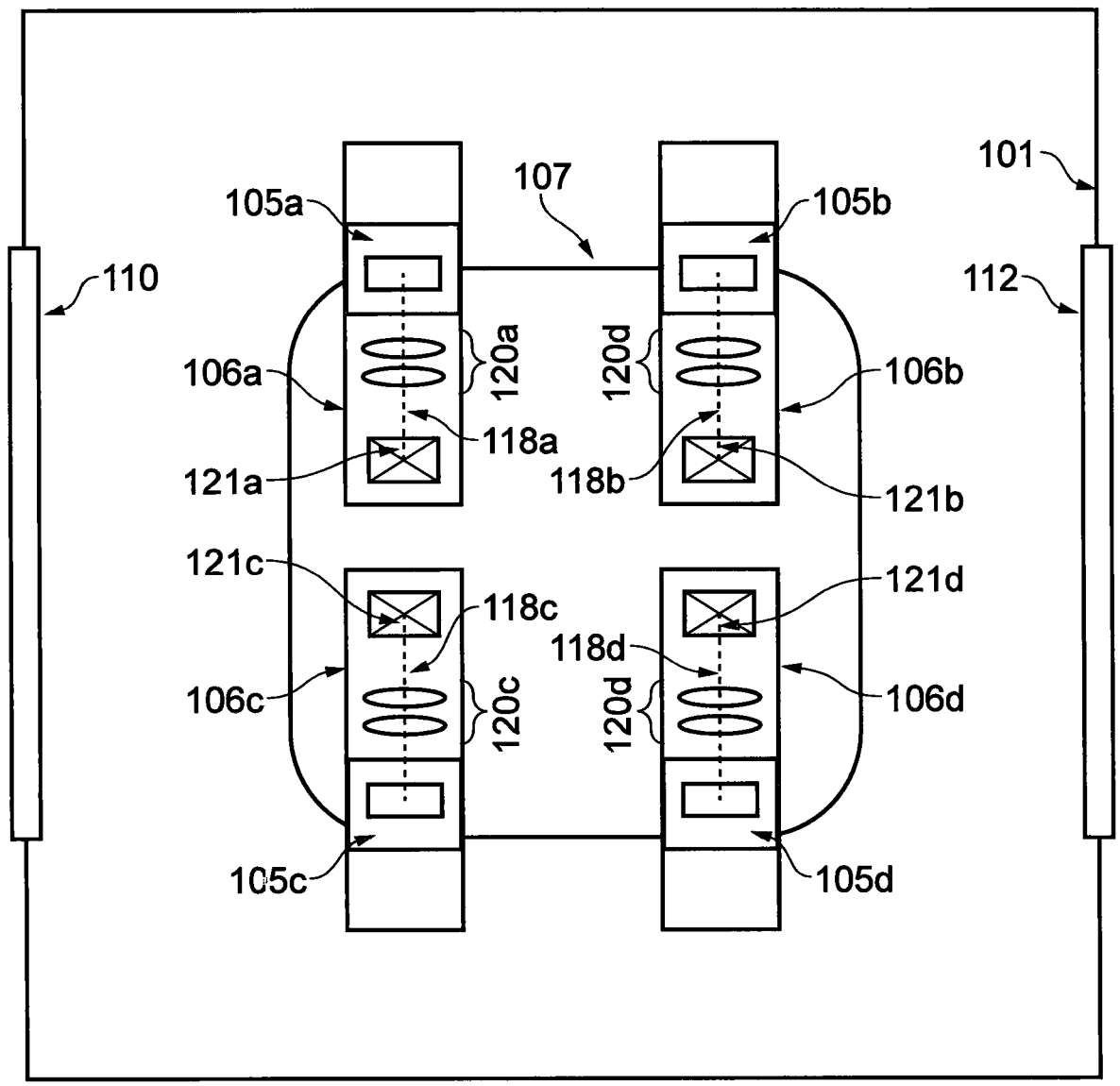
FIG. 2 is a schematic view of the laser solidification apparatus from above.

Referring to FIGS. 1 and 2, an additive manufacturing apparatus according to an embodiment of the invention comprises a build chamber 101 sealable from the external environment such that an inert atmosphere can be maintained therein. Within the build chamber 101 are partitions 115, 116 that define a build sleeve 117. A build platform 102 is lowerable in the build sleeve 117. The build platform 102 supports a powder bed 104 and workpiece 103 as the workpiece is built by selective laser melting of the powder. The platform 102 is lowered within the build sleeve 117 under the control of a drive (not shown) as successive layers of the workpiece 103 are formed.

Layers of powder 104 are formed as the workpiece 103 is built by dispensing apparatus and a wiper (not shown). For example, the dispensing apparatus may be apparatus as described in WO2010/007396. The dispensing apparatus dispenses powder onto an upper surface defined by partition 115 and is spread across the powder bed by wiper. A position of a lower edge of the wiper defines a working plane 190 at which powder is consolidated.

A plurality of laser modules 105a, 105b, 105c and 105d generate laser beams 118a, 118b, 118c, 118d for melting the powder 104, the laser beams 118a, 118b, 118c, 188d directed as required by a corresponding optical module 106a, 106b, 106c, 106d. The laser beams 118a, 118b, 118c, 118d enter through a common laser window 107. Each optical module comprises steering optics 121, such as two mirrors mounted on galvanometers, for steering the laser beam 118 in perpendicular directions across the working plane and focussing optics 120, such as two movable lenses for changing the focus of the laser beam 118. The scanner is controlled such that the focal position of the laser beam 118 remains in the working plane as the laser beam 118 is moved across the working plane. Rather than maintaining the focal position of the laser beam in a plane using dynamic focusing elements, an f-theta lens may be used.

An inlet 112 and outlet 110 are arranged for generating a gas flow across the powder bed formed on the build platform 102. The inlet 112 and outlet 110 are arranged to produce a laminar flow having a flow direction from the inlet to the outlet, as indicated by arrows 191. Gas is re-circulated from the outlet 110 to the inlet 112 through a gas recirculation loop 111. A pump 113 maintains the desired gas pressure at inlet 112 and outlet 110. A filter 114 is provided in the recirculation loop 111 to filter from the gas condensate that has become entrapped in the flow. It will be understood that more than one inlet 112 may be provided in the build chamber 101. Furthermore, rather than extending outside of the build chamber 101, the recirculation loop 111 may be contained within the build chamber 101.

A controller 140, comprising processor 161 and memory 162, is in communication with modules of the additive manufacturing apparatus, namely the laser modules 105a, 105b, 105c, 105d, optical modules 106a, 106b, 106c, 106d, build platform 102, dispensing apparatus and wiper. The controller 140 controls the modules based upon software stored in memory 162 as described below.

Figure 3:
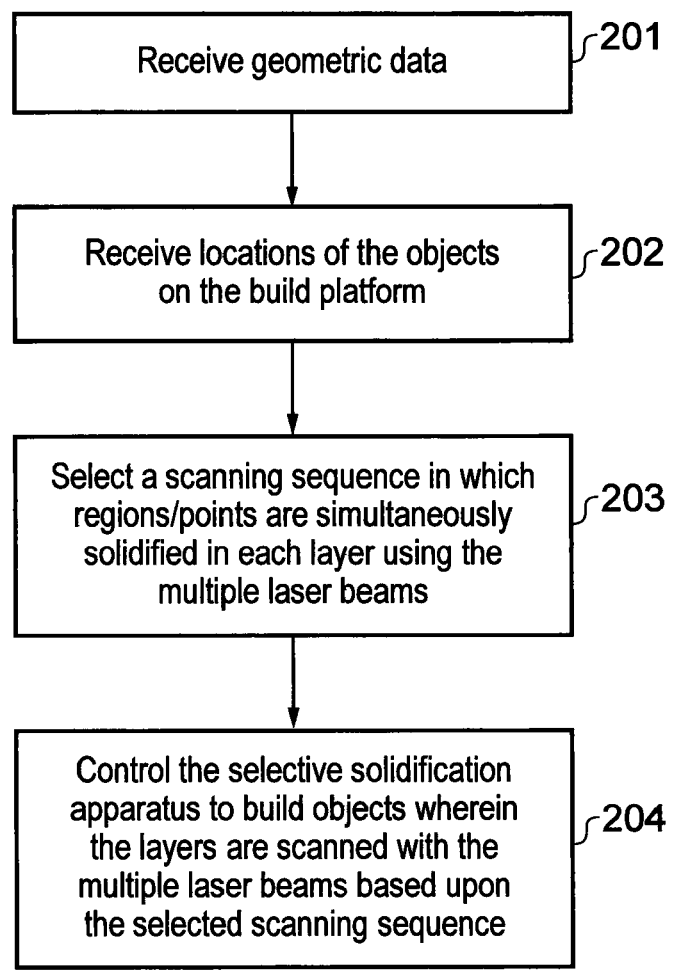
FIG. 3 is a flowchart showing the steps of a method according to an embodiment of the invention.

Referring to FIG. 3, geometric data of objects to be built, such as in the form of an STL file, are received 201 by the computer 140, for example over the external data connection 135. The processing unit 161 receives 202 information on the location of the objects on the build platform 102. This location information may already be defined in the STL or the user may select, using the user input device 136, where each object should be located on the build platform 102. For each layer, the processing unit 140 identifies areas of the layer that are to be solidified and determines 203 points to be exposed simultaneously by the laser beams. Examples of how this may be done is described below with reference to FIG. 4. In step 204, the controller 140 controls the selective solidification apparatus to build workpiece in accordance with the selected scanning sequence.

Figure 4:
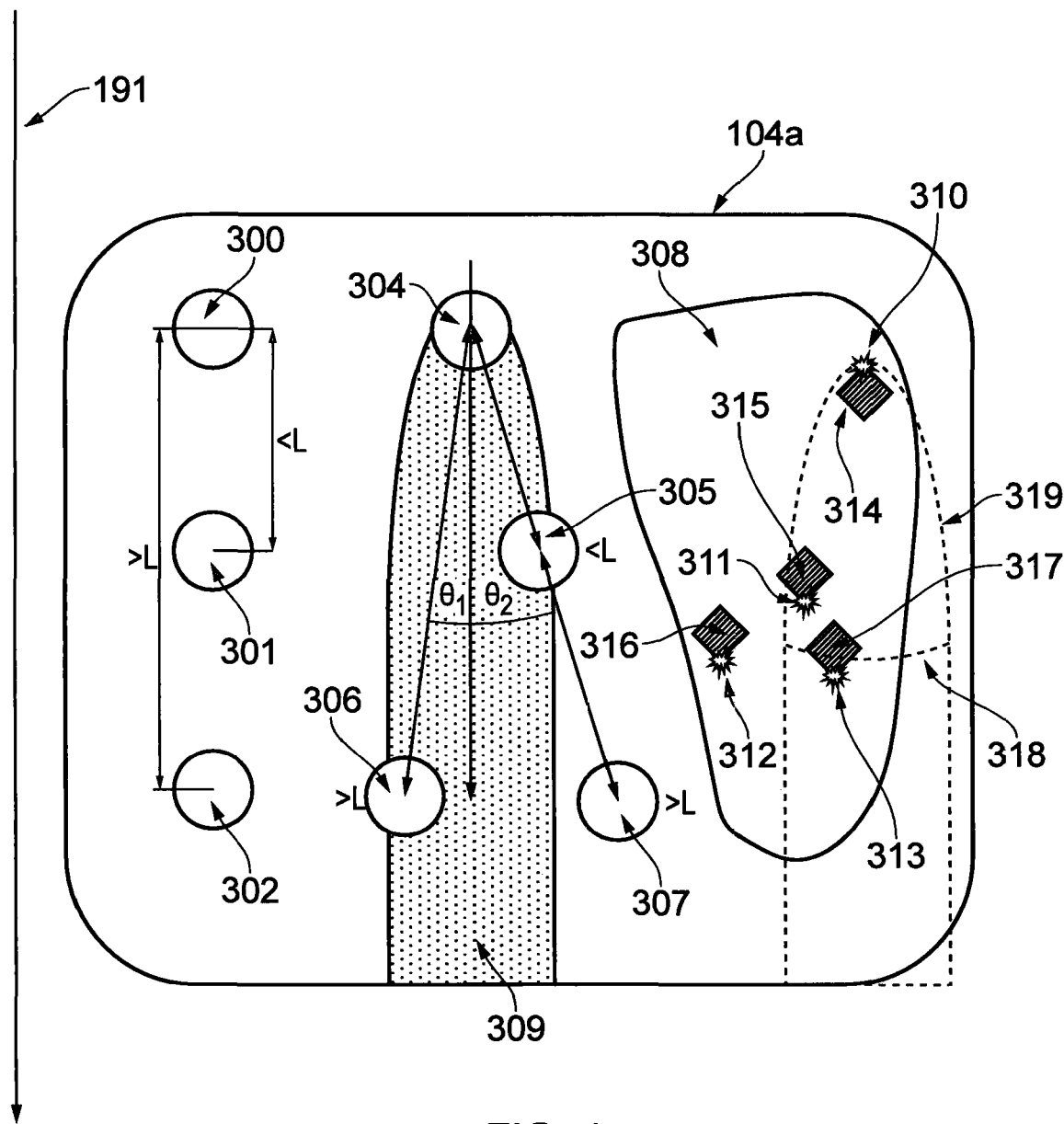
FIG. 4 is a plan view of areas to be solidified in a powder layer illustrating downstream regions that can and cannot be solidified simultaneously with ones of the upstream regions in accordance with an embodiment of the invention.

FIG. 4 shows a number of islands 300 to 308 to be solidified in a powder layer 104a. In a first example of determining a scanning sequence, the relative positions of islands 301 and 302 in the gas flow direction 191 from the island 300 that is furthest upstream are determined. In FIG. 4, the island 301 is a distance less than a maximum separation distance L from island 300 whereas island 302 is a distance greater than the maximum separation distance L from island 300. Accordingly, it is determined that island 301 can be solidified simultaneously with island 300 whereas island 302 will have to be solidified at a different time. A processor than allocates one or more of the laser beams to the simultaneous solidification of islands 300 and 301. If a decision is made to not solidify islands 300 and 301 simultaneously, then a relative distance between islands 301 and 302 may be such that these islands can be solidified simultaneously.

Determining a scanning sequence based upon a relative position of islands in the gas flow direction without taking into account a spacing of the islands in a direction perpendicular to the gas flow direction 191 may be unduly limiting for laser beam allocation as an island spaced a sufficient distance apart from an upwind island in a direction perpendicular to the gas flow direction 191 may be unaffected by the solidification of the upwind island. In a second example shown in FIG. 4, a relative position of the islands 305, 306, 307 to an upwind island 304 in a direction perpendicular to the gas flow direction 191 is also taken into account.

Shaded area 309 indicates a gas-borne debris zone across which gas-borne debris generated during solidification of island 304 is expected to be carried by the gas flow 191. Islands 305 and 306 fall within the zone 309 (and are therefore, downstream islands) whereas island 307 falls outside the zone 309 (and is therefore a downwind but not a downstream island). Downstream island 305 is less than the maximum separation distance from upstream island 304 and therefore, can be solidified simultaneously with island 304 even though it falls within zone 309. Downstream island 306 falls within the zone 309 and is further than the maximum separation distance from upstream island 304 and therefore, cannot be simultaneously solidified with island 304. Island 307 is further than the maximum separation distance from upstream island 304 but falls outside zone 309 and therefore, can be simultaneously solidified with upwind island 304.

For islands 306, 307 that are more than the maximum separation distance from an upwind island 304, whether the island 306, 307 falls within the zone 309 and therefore, is prohibited from being solidified simultaneously with the upwind island 304, may be defined by a function of the islands distance from the upwind island 304 in the gas flow direction and an angle $\theta_1$, $\theta_2$ between a line joining a centroid or other geometric measure of the locations of the upwind and downwind islands 304 and 306, 307 and the direction of gas flow 191.

The third example is for an area/island having an extent in the powder layer that is greater than the maximum separation distance but could also be applied to a number of smaller islands, such as 300 to 307. In this example, to determine downwind points or areas 311 to 313, 315 to 317 that can be solidified using a laser beam simultaneously with an upwind point or area 310, 314, a window is determined that defines an area within which downstream points or areas cannot be solidified simultaneously with the upstream point or area 310, 314. In FIG. 4, dotted line 319 indicates a gas-borne debris zone across which gas-borne debris generated by the solidification of the point or area 310, 314 is carried by the gas flow 191. Dotted line 318 indicates the boundary line in that zone 319 beyond which downstream points would become adversely effected by the debris. The extent of this zone may be defined as a function of distance and angle from the exposure point/area, in this example 310, 314.

In the example shown, point 311 falls within the gas-borne debris zone 319 (and is therefore a downstream point) but is within a maximum separation distance of the upstream exposure point 310 such that downstream point 311 can be simultaneously solidified together with point 310. However, point 313, which also falls within the gas borne debris zone 319 and therefore is a downstream point, is further than the maximum separation distance and therefore, cannot be selected for simultaneous solidification together with exposure point 310. Exposure point 312 is also further than the maximum separation distance but is outside of the gas-borne debris zone 319 (and therefore, is not a downstream point of exposure point 310 even though it is downwind of exposure point 310) and therefore, can be exposed simultaneously with exposure of point 310.

Rather than considering the selection of points to be solidified simultaneously on a point-by-point basis, the selection process may carry out the determination at a lower resolution, for example at the resolution of a series of stripe segments 314, 315, 316 and 317. Each stripe segment 314, 315, 316 and 317 comprises a plurality of parallel hatch lines, wherein a plurality of points is exposed to one of the laser beams along each hatch line. One laser beam may be allocated to the scanning of each stripe segment 314, 315, 316 and 317. The processor selects whether points of stripe segment 314 can be simultaneously solidified with points of another stripe segment 315, 316, 217 based upon the relative locations of the stripe segments 314, 315, 316 and 317. In FIG. 4, the prohibited zone/window is determined based upon the most upwind point 310 of the upwind stripe segment 314. Downwind stripe segments 315, 316, 317 can be selected for simultaneous solidification with the upwind stripe segment 314 if the most downwind point 311, 312, 313 of the downwind stripe segment 315, 316, 317 meets the specified conditions for simultaneous solidification.

In the example shown, the downwind most point 311 of stripe segment 315 falls within the gas-borne debris zone 319 but is within a maximum separation distance of the upwind most point 310 of upwind (and also upstream) stripe segment 314 such that exposure of the downstream stripe segment 315 can be selected to be simultaneously solidified together with stripe segment 314. Downwind most point 313 of stripe segment 317 falls within the gas-borne debris zone 319 is further than the maximum separation distance from point 310 and therefore, the whole of stripe segment 317 is deemed to be barred from being solidified simultaneously with stripe segment 314 (even though part of stripe segment 317 is within the maximum separation distance). Downwind most exposure point 312 of stripe segment 316 is also further than the maximum separation distance but is outside of the gas-borne debris zone 319 so can be selected to be solidified simultaneously with upwind stripe segment 314.

The method may comprise an iterative process in which exposure points, regions or islands are selected for simultaneous solidification based upon the above described selection criteria. The iterative process may first consider the exposure points, regions or islands that are furthest upwind on the working surface of the powder bed and then iteratively progress through the exposure points, regions or islands in a downwind direction selecting points to be solidified together until all exposure points have been allocated an exposure time. This iterative process is carried out for each layer.

The processor may determine an order in which the exposure points are scanned such that the scan solidifies the exposure points in a direction generally opposed to the gas flow.

It will be understood that the selection of exposure points to be solidified together may be carried out based upon the relative locations of other scan elements, such as hatch lines, hatch line segments or groups of stripe segments, such as groups of squares of a chequerboard pattern.

Example 1

Figure 5:
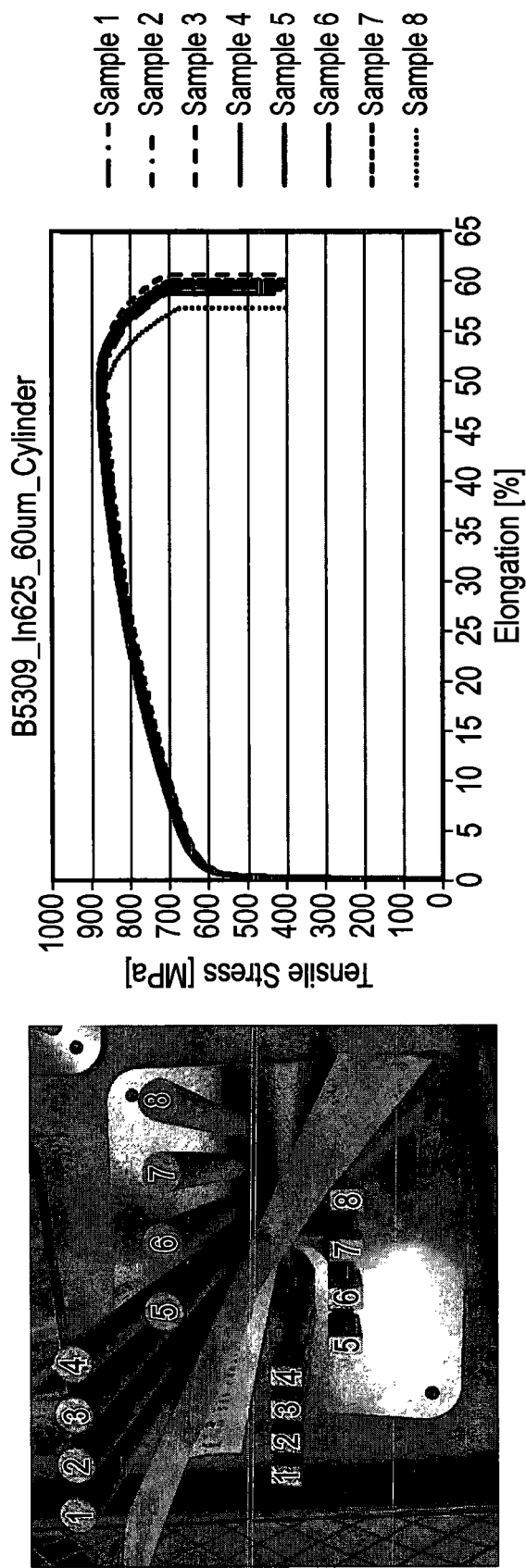
FIG. 5 illustrates the layout of a first experimental build of test cylinders and bars and measured mechanical properties of the test cylinders and bars.
Figure 6:
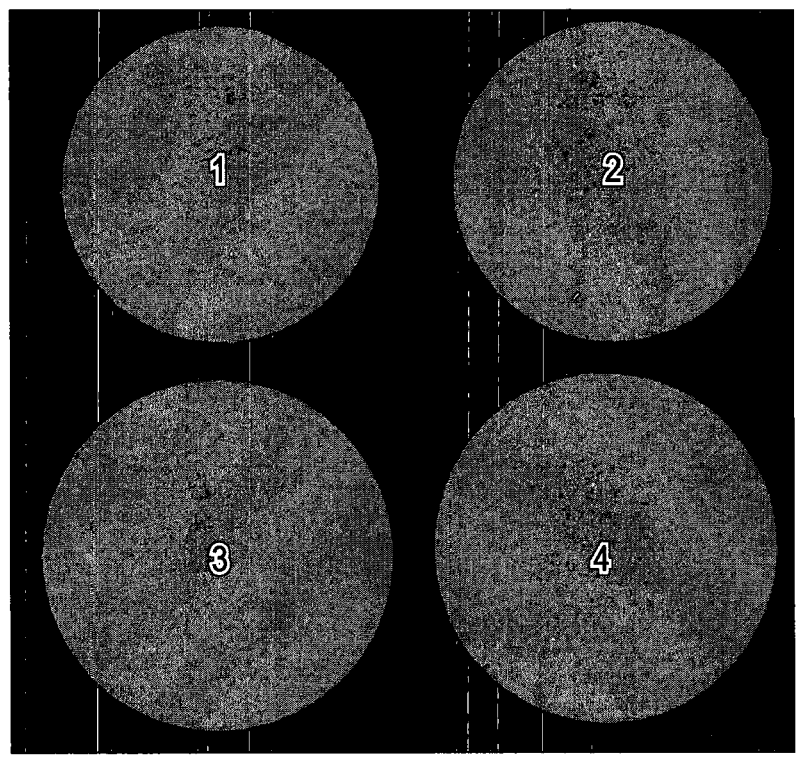
FIG. 6 shows optical micrograph images of surfaces of ones of the test cylinders of the first experimental build taken at 75× magnification.
Figure 6:
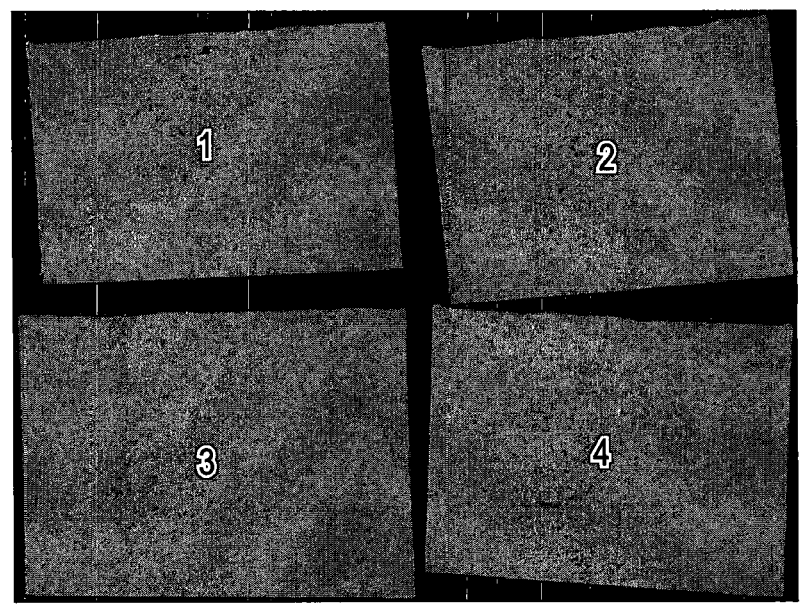
Figure 7:
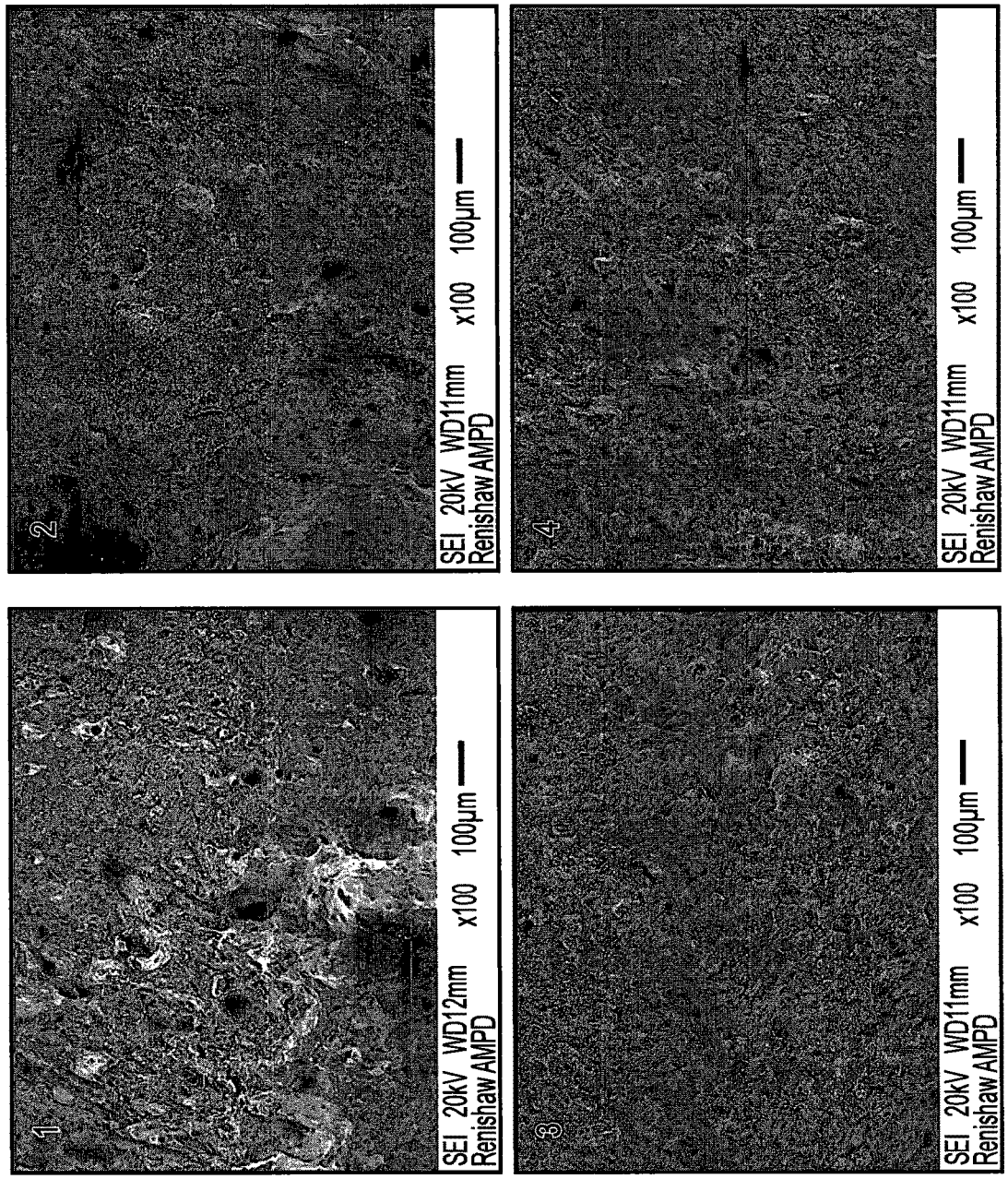
FIG. 7 shows scanning electron microscope images of the fracture surface for downstream, upstream and standalone test bars of the first experimental build.

FIG. 5 shows a build layout and resultant build of a first experimental build carried out on a RenAM 500 Q selective laser melting machine in Inconel 625. The gas flow direction was from right to left. As can be seen, two groups of four test cylinders and two groups of four test bars were built located close together but at different locations in the gas flow direction. Test cylinders 1,2,3 were built through simultaneous exposures as were cylinders 7 and 8. Test cylinders 4, 5 and 6 were built alone at a different time to the other test cylinders of that group. For the test bars, the central test bars of each group were solidified simultaneously whereas the outer test bars were built alone at a different time to the other test bars of that group. As can be seen from the measured physical properties under a fracture test, there is little difference between the physical properties of the test cylinders and bars. This is further supported by the images shown in FIGS. 6 and 7 showing little difference between downstream, upstream and standalone test cylinders and test bars.

Example 2

Figure 8:
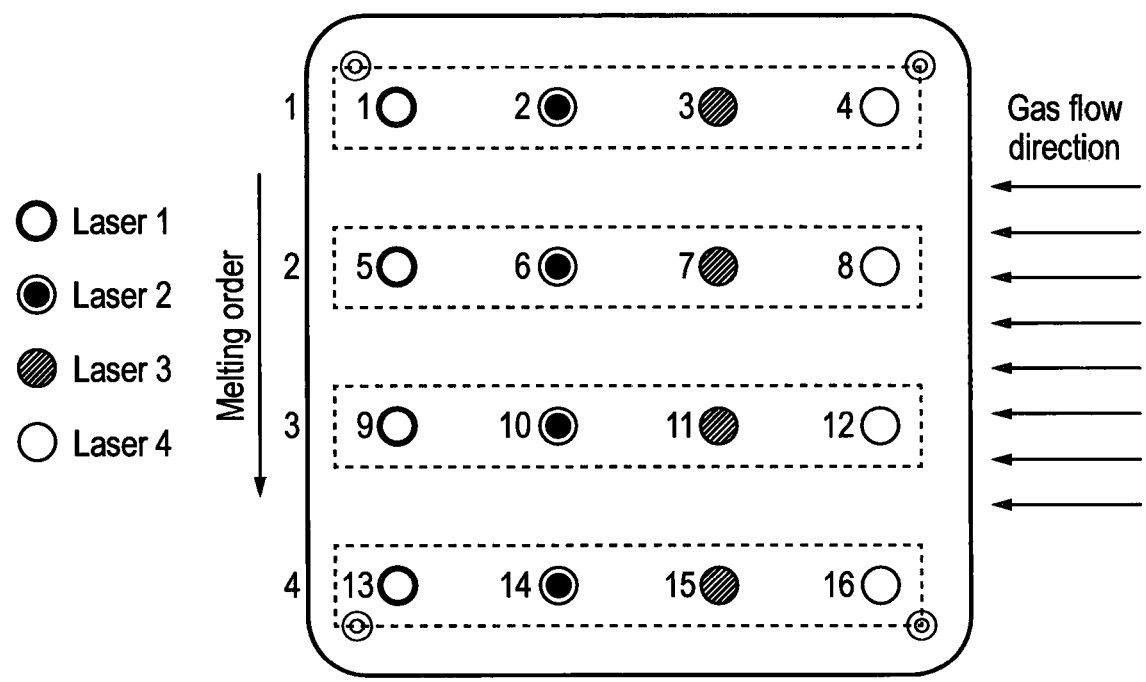
FIG. 8 illustrates the layout of a second experimental build of test cylinders.

FIG. 8 shows the layout for a build of test cylinders of a second experimental build built on a RenAM 500 Q selective laser melting machine in Inconel 625. The layer thickness was 60 µm. The gas flow direction is shown. In this example, the test cylinders are spread out across the build volume with the four test cylinders of each group 1, 2, 3 and 4 being solidified simultaneously with different laser beams. Cylinders 1, 5, 9 and 13 were all solidified using laser 1, cylinders 3, 6, 10 and 14 were all solidified using laser 2, cylinders 3, 7, 11 and 15 were all solidified using laser 3 and cylinders 4, 8, 12 and 16 were all solidified using laser 4.

Figure 9:
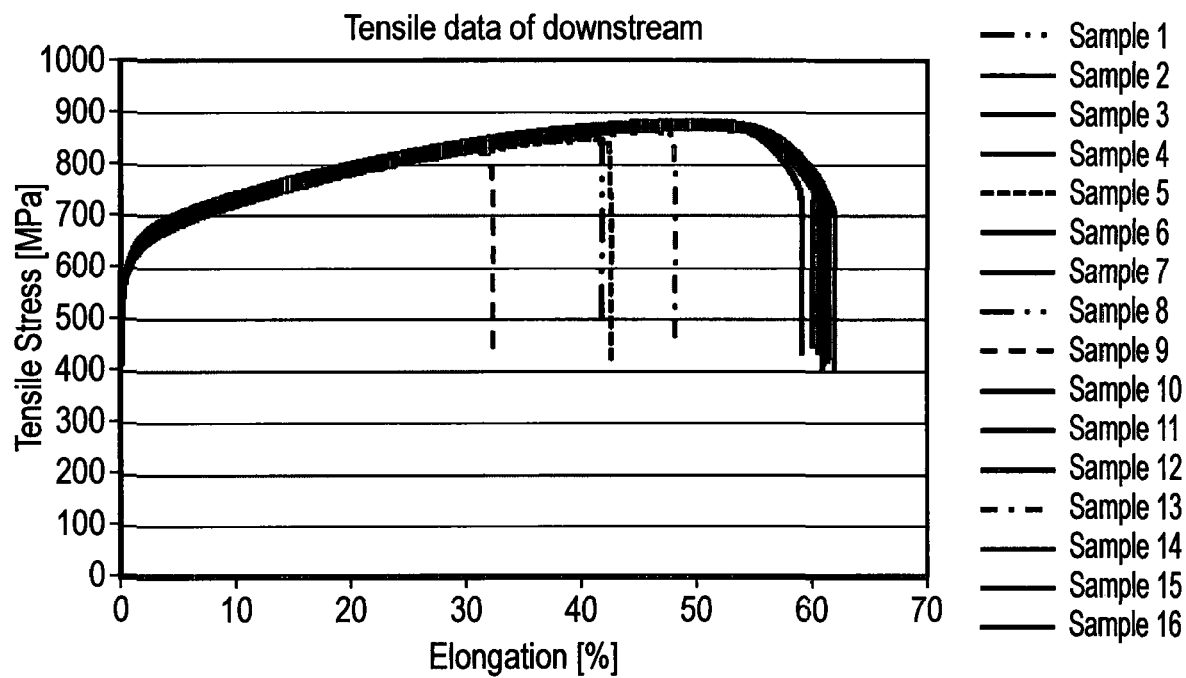
FIG. 9 shows the measured mechanical properties of the test cylinders of the second experimental build.
Figure 10A:
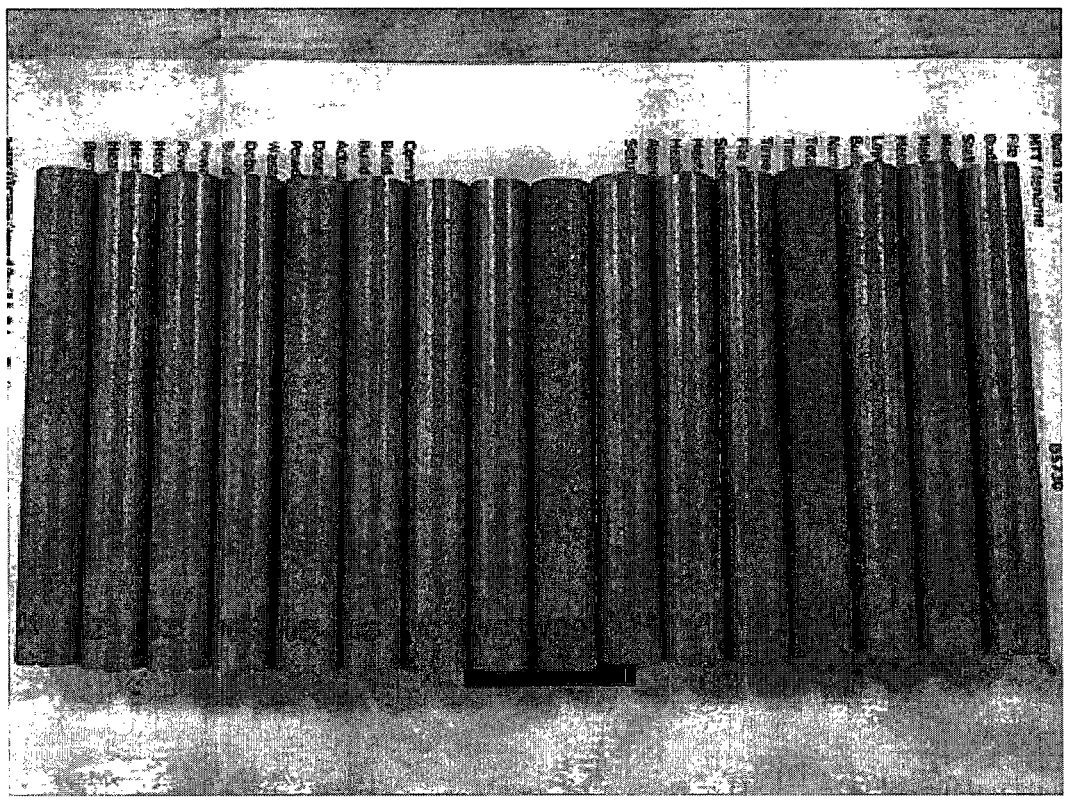
FIG. 10*a* is a photograph of the test cylinders of the second experimental build in numerical order and FIG. 10*b* shows the measured mean surface finish, Ra and Rz for the test cylinders.
Figure 10B:
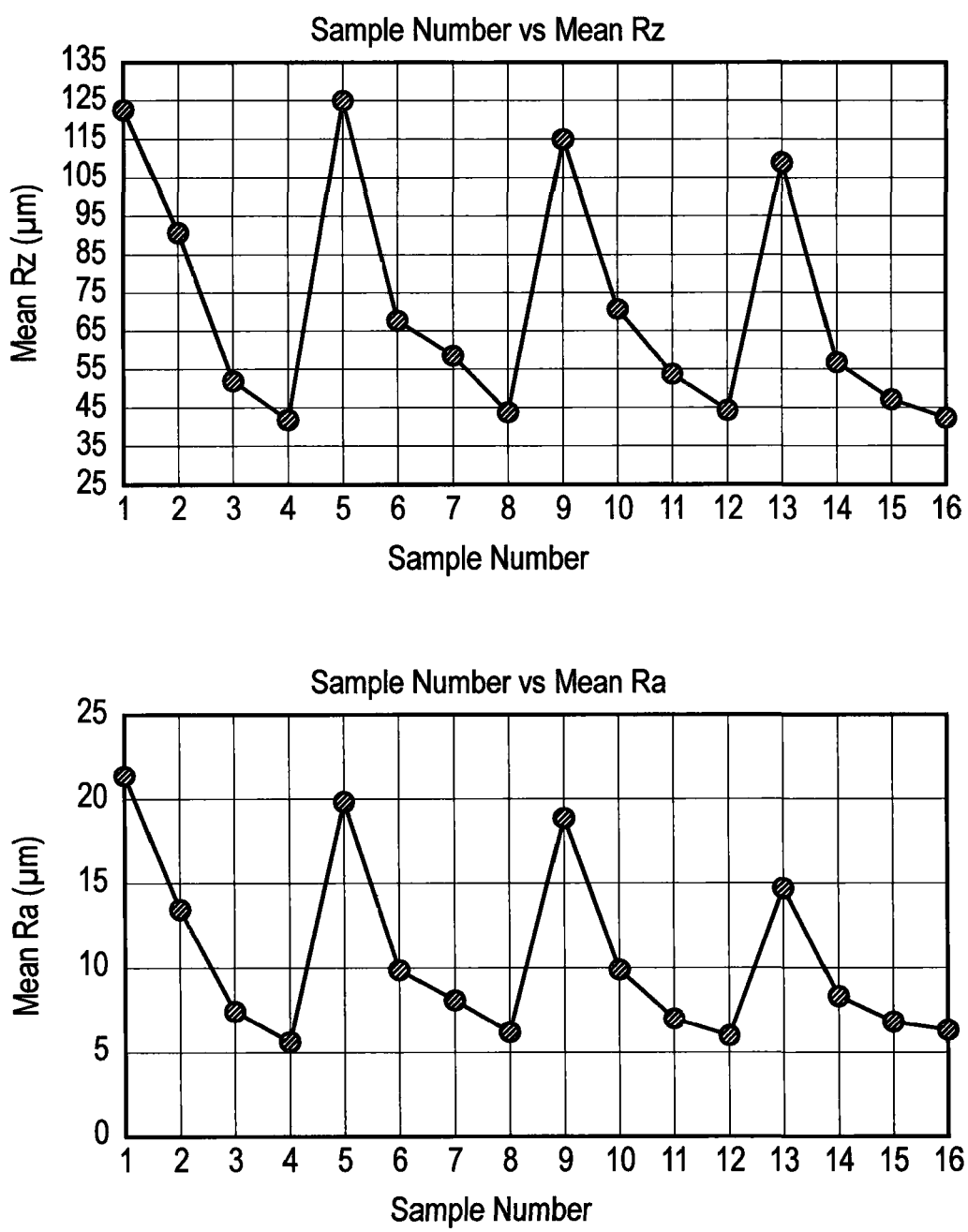
Figure 11:
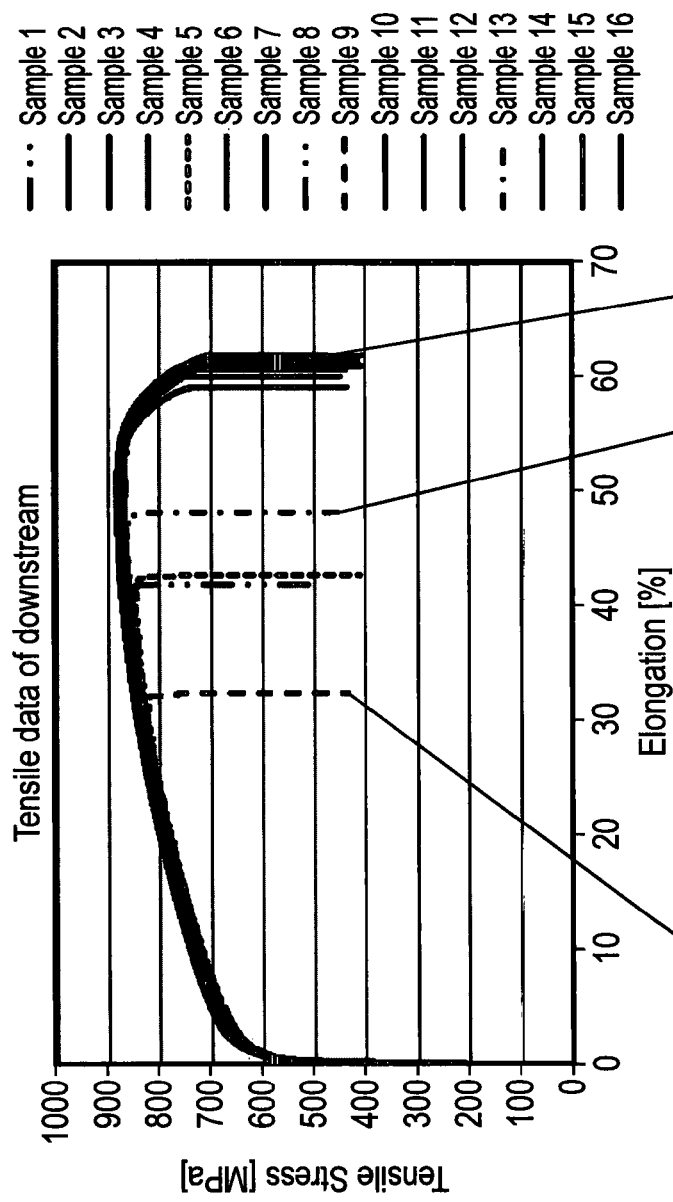
FIG. 11 shows scanning electron microscope images of the fracture surface for selected ones of the test cylinders of the second experimental build.
Figure 11:
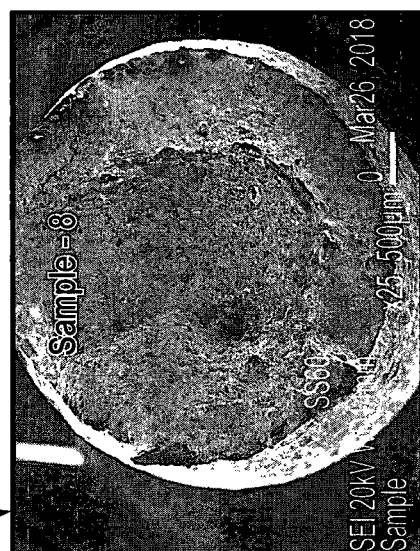
Figure 11:
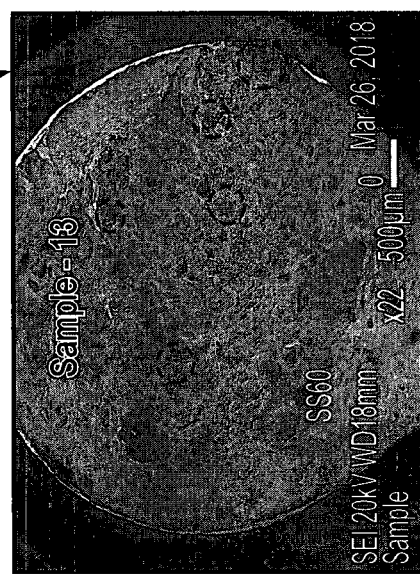
Figure 11:
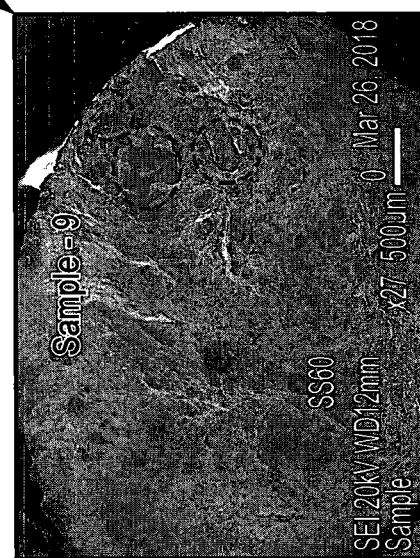

As can be seen from FIG. 9, the physical properties determined under fracture testing for test cylinders 1, 5, 9 and 13 are significantly different to the other test cylinders 2-4, 6-8, 10-12 and 14-16. The variations in physical properties for the other test cylinders 2-4, 6-8, 10-12 and 14-16 is relatively small. FIGS. 10a and 10b show that the surface finish for test cylinders 1, 5, 9 and 13 is poor compared to the other test cylinders. FIG. 11 shows the porosity that is visible in the parts 9 and 13 compared to a "good" test cylinder 8. Samples 9 and 13 include millimetre sized smooth regions (circled by the dotted lines) that are not present in sample 8. This feature is much larger than the size of splatter particles generated by the melting process (typically up to a few hundred micrometres in size) suggesting a failure to generate a fully dense part. The mean elongation is 56% and the coefficient of variance (CoV) is 16%.

Example 3

Figure 12:
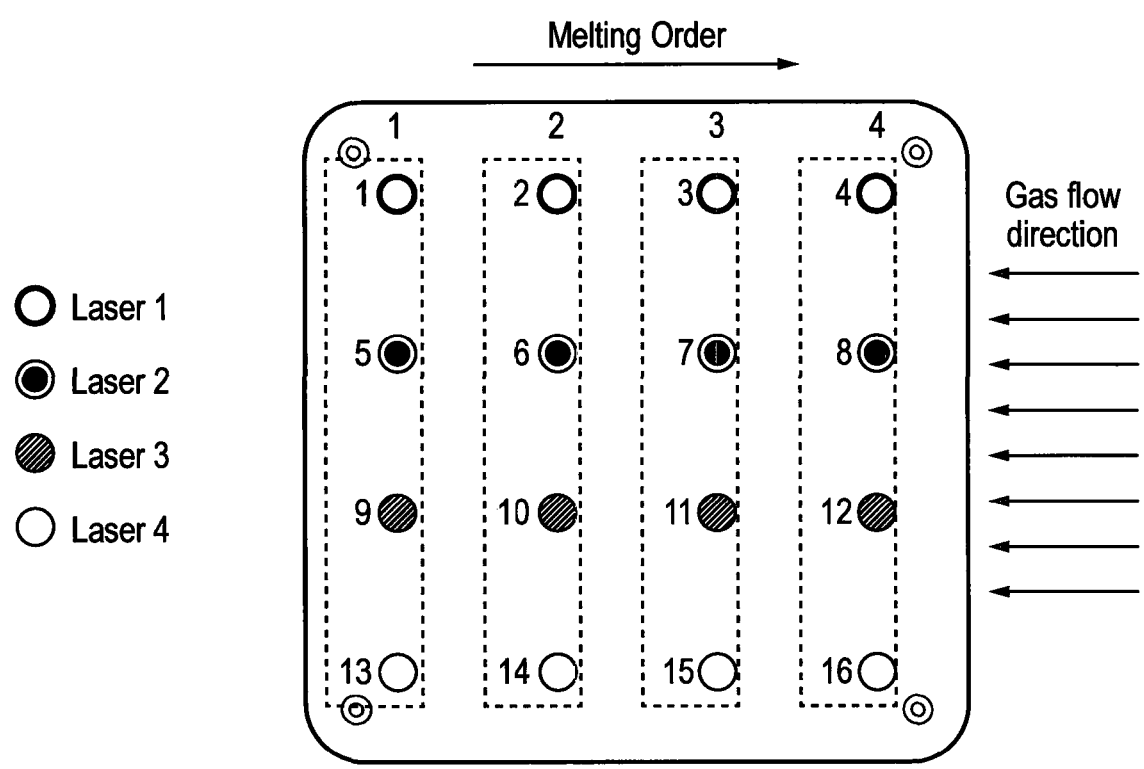
FIG. 12 illustrates the layout of a third experimental build of test cylinders.

FIG. 12 shows a build layout and resultant build of a third experimental build carried out on a RenAM 500 Q selective laser melting machine in Inconel 625. The layer thickness was 60 µm. The gas flow direction is shown. In this example, the test cylinders are spread out across the build volume with the four test cylinders of each group 1, 2, 3 and 4 being solidified simultaneously with the different lasers. Cylinders 1, 2, 3 and 4 were all solidified using laser 1, cylinders 5, 6, 7 and 8 were all solidified using laser 2, cylinders 9, 10, 11 and 12 were all solidified using laser 3 and cylinders 13, 14, 15 and 16 were all solidified using laser 4.

Figure 13:
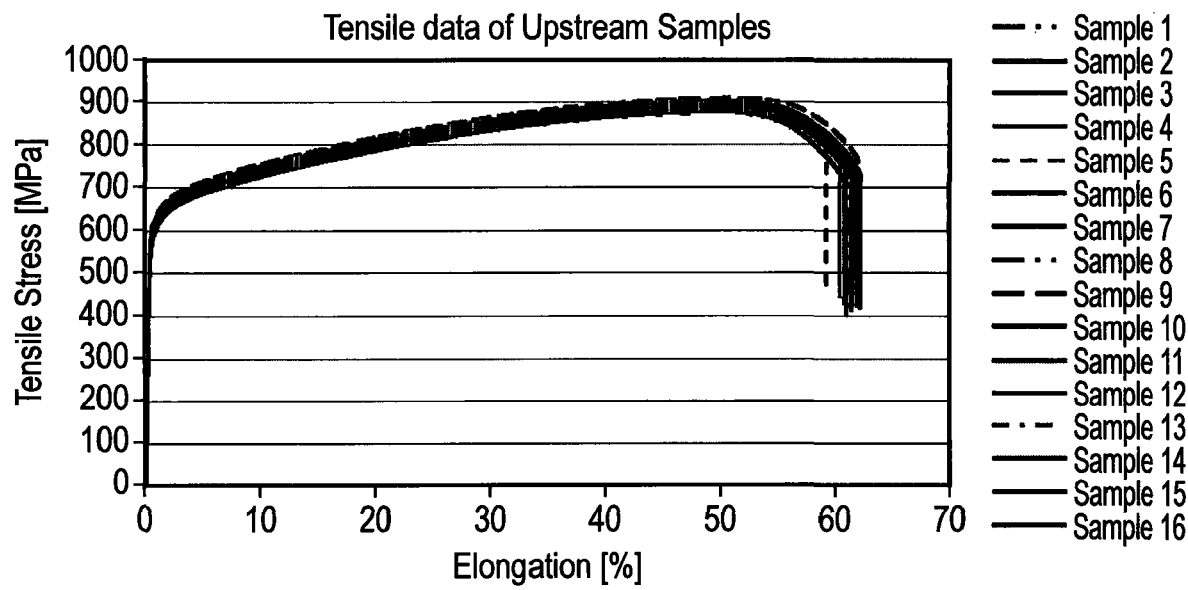
FIG. 13 shows the measured mechanical properties of the test cylinders of the third experimental build.

As can be seen from FIG. 13, there is only a small variation in the measured physical properties of the test cylinders under a fracture test. The mean elongation is 61% and the coefficient of variance is 1.3%.

Example 4

A further build of test cylinders was carried out using the 4×4 array of test cylinder shown in FIGS. 8 and 12 but wherein, in turn, each test cylinder was formed using all four lasers. A stripe scanning strategy was used to form the cross-sections of the test cylinders, wherein different stripes of the same test cylinder were scanned simultaneously by different ones of the lasers.

Figure 22:
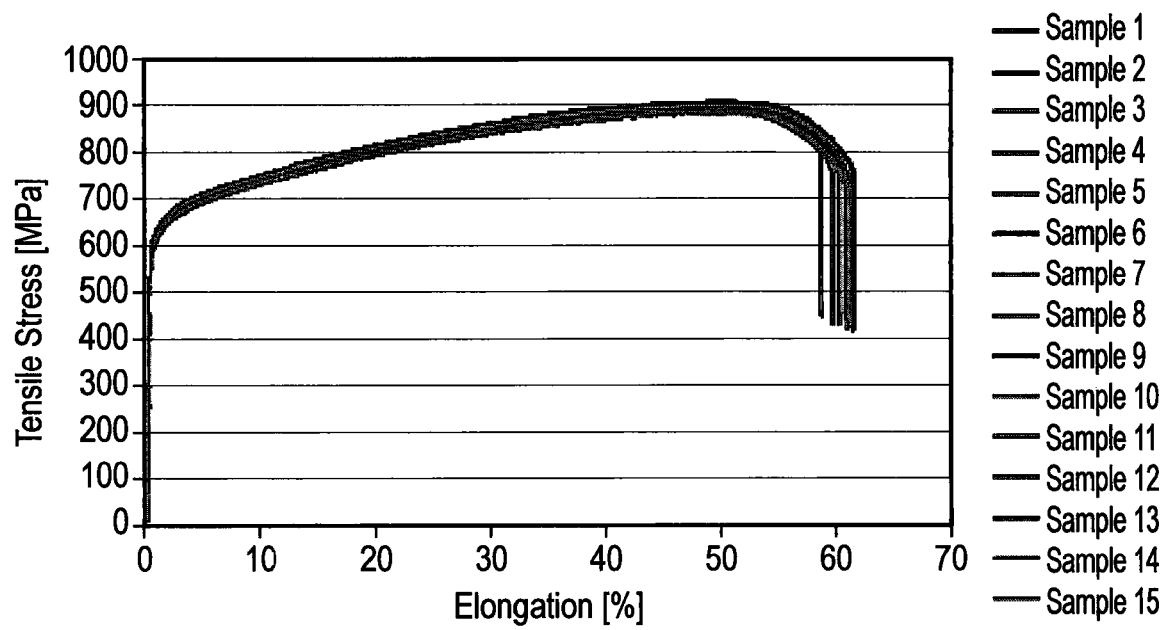
FIG. 22 shows measured mechanical properties of test cylinders built in accordance with the layout shown in FIGS. 8 and 12, wherein each test cylinder is built through the simultaneous scanning of stripes of that test cylinder by all four lasers.

FIG. 22 shows the stress-strain curves for the test cylinders built in this experiment. As can be seen, there is only a small variation in the measured physical properties of the test cylinders under a fracture test. The mean elongation is 61% and the coefficient of variance is 1.3%. The results compare favourably to those of Example 2.

These results indicate that distance between upstream and downstream laser points used to simultaneously process the powder bed is a factor affecting the resultant mechanical properties of the part, since using four laser scanning points close together in Example 4 delivers the same performance as Example 3, whereas using all four lasers scanning points relatively far apart, as in Example 2, results in lesser mechanical properties.

Example 5

Figure 14:
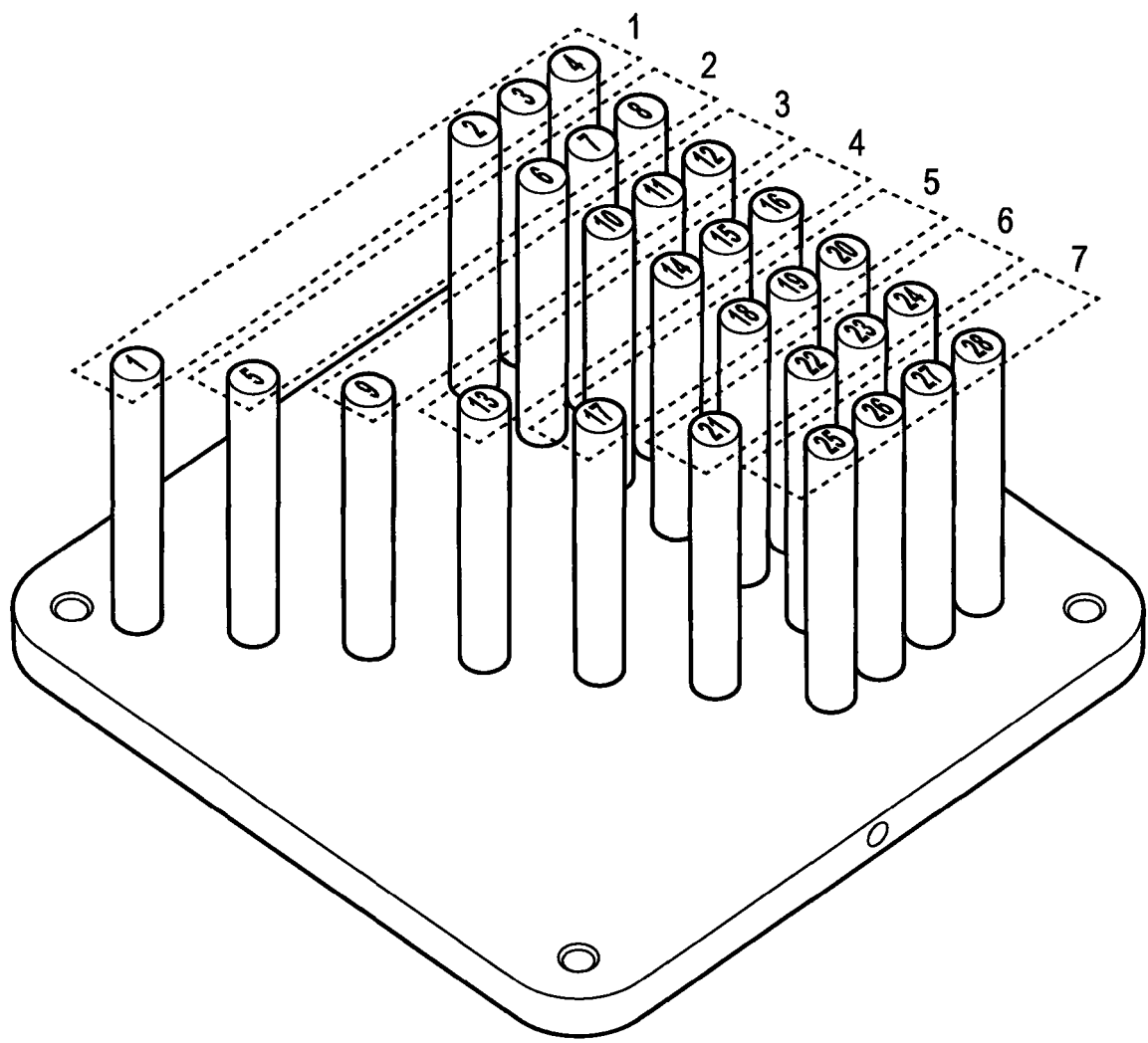
FIG. 14 illustrates the layout of a fourth experimental build of test cylinders.
Figure 15:
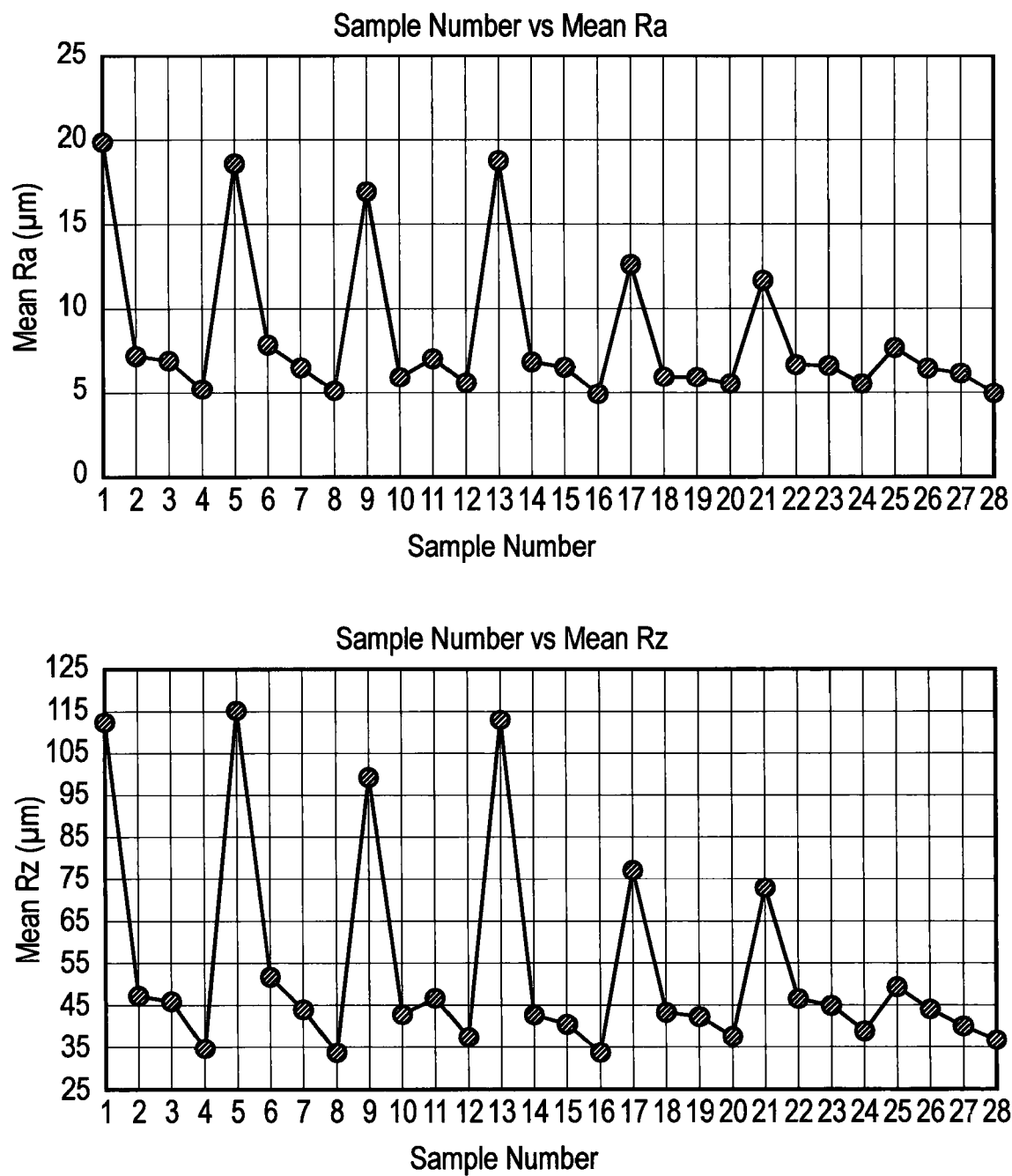
FIG. 15 is a graph showing the measured mean surface finish, Ra and Rz, for the test cylinders of the fourth experimental build.
Figure 16:
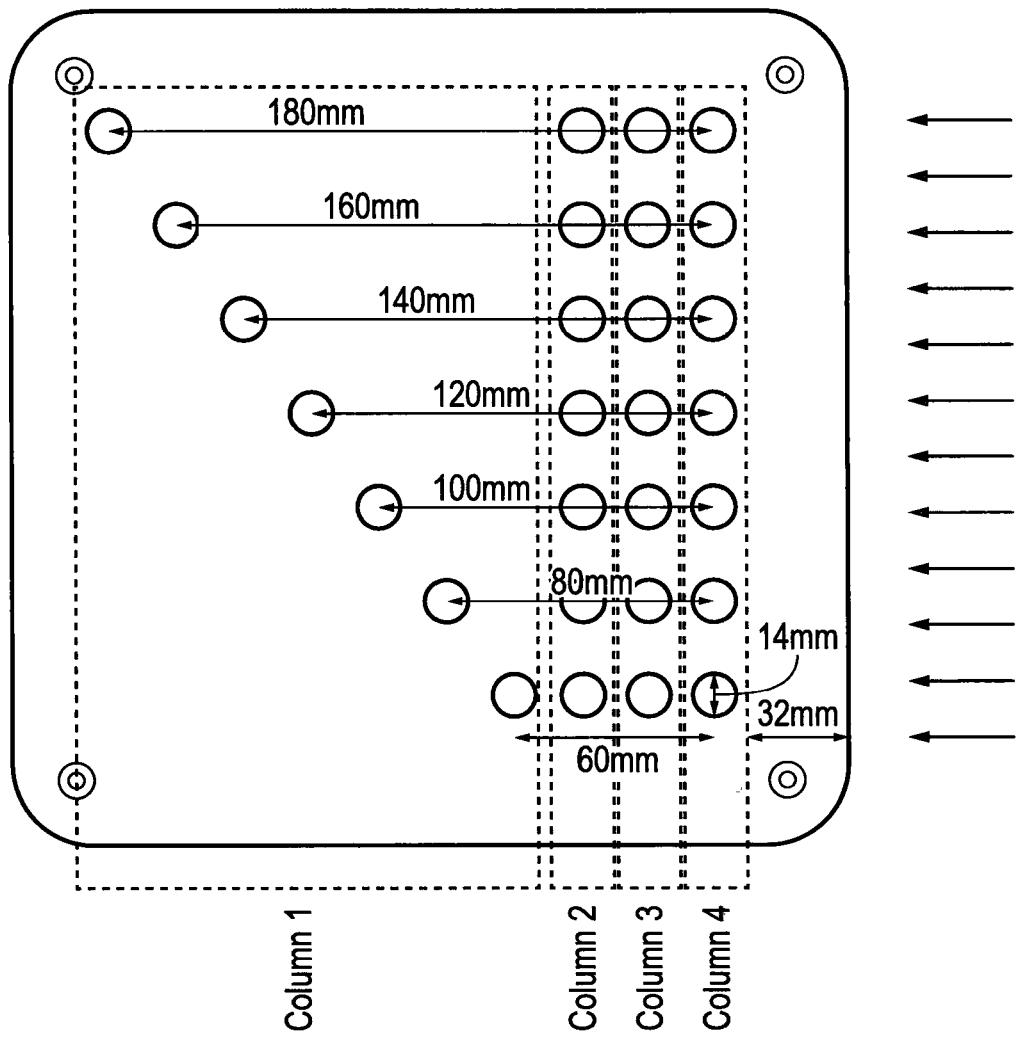
FIG. 16 is a plan view of the build layout for the fourth experimental design showing the distances between the windward most test cylinder and leeward most test cylinder for each group.

FIGS. 14 and 16 show a build layout for a fourth experimental build carried out on a RenAM 500 Q selective laser melting machine in Inconel 718. The layer thickness was 60 µm. The gas flow direction is shown by the arrows. In this example, groups 1 to 7 of four the test cylinders are built across the build volume, with the test cylinder furthest downwind being spaced from the remaining test cylinders of the group by a different distance for each group. It has been found that the further the downstream-most test cylinder is from the remaining test cylinders of the group the larger the variation in the physical properties compared to the other test cylinders for the group. As can be seen from the graphs of FIG. 15, the further the downstream-most test cylinder is from the other test cylinders of the group, the greater its surface roughness. For test cylinders 25, 21 and 17, the surface roughness steadily increases but there is a sudden increase in the surface roughness between test cylinders 17 and 13. This suggests a maximum separation distance should be between the distance between test cylinders 13 and 16 and the distance between test cylinders 25 and 28.

Figure 17A:
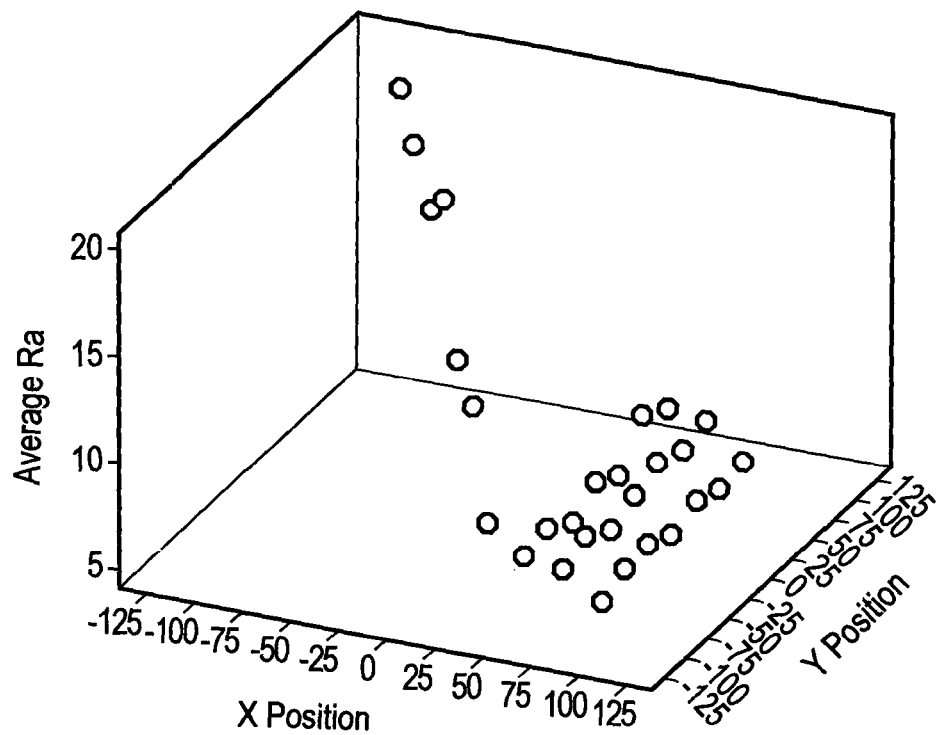
FIG. 17*a* is a scatterplot of mean Ra versus position for the test cylinders of the fourth experimental build and FIG. 17*b* is a scatterplot of mean Rz versus position for the test cylinders of the fourth experimental build
Figure 17B:
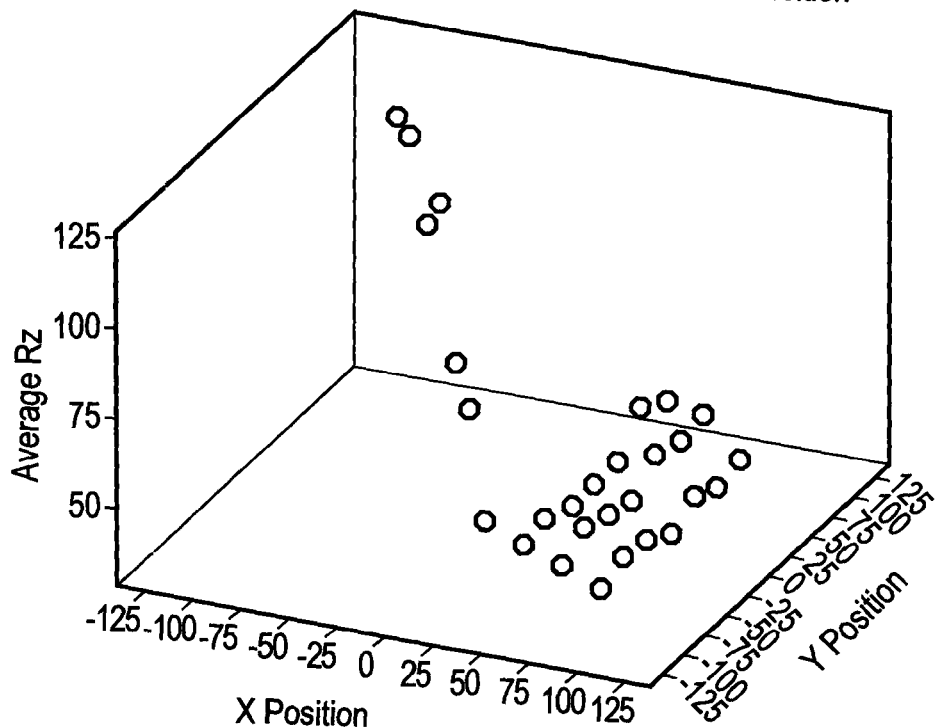

FIG. 16 shows the relative positions (centre to centre) of the test cylinders and FIGS. 17a and 17b plot Ra and Rz as a function of the corresponding test cylinders position. This suggests that, for Inconel when processed on a RenAM 500 Q, the maximum separation distance should be between 60 mm and 120 mm.

Figure 18A:
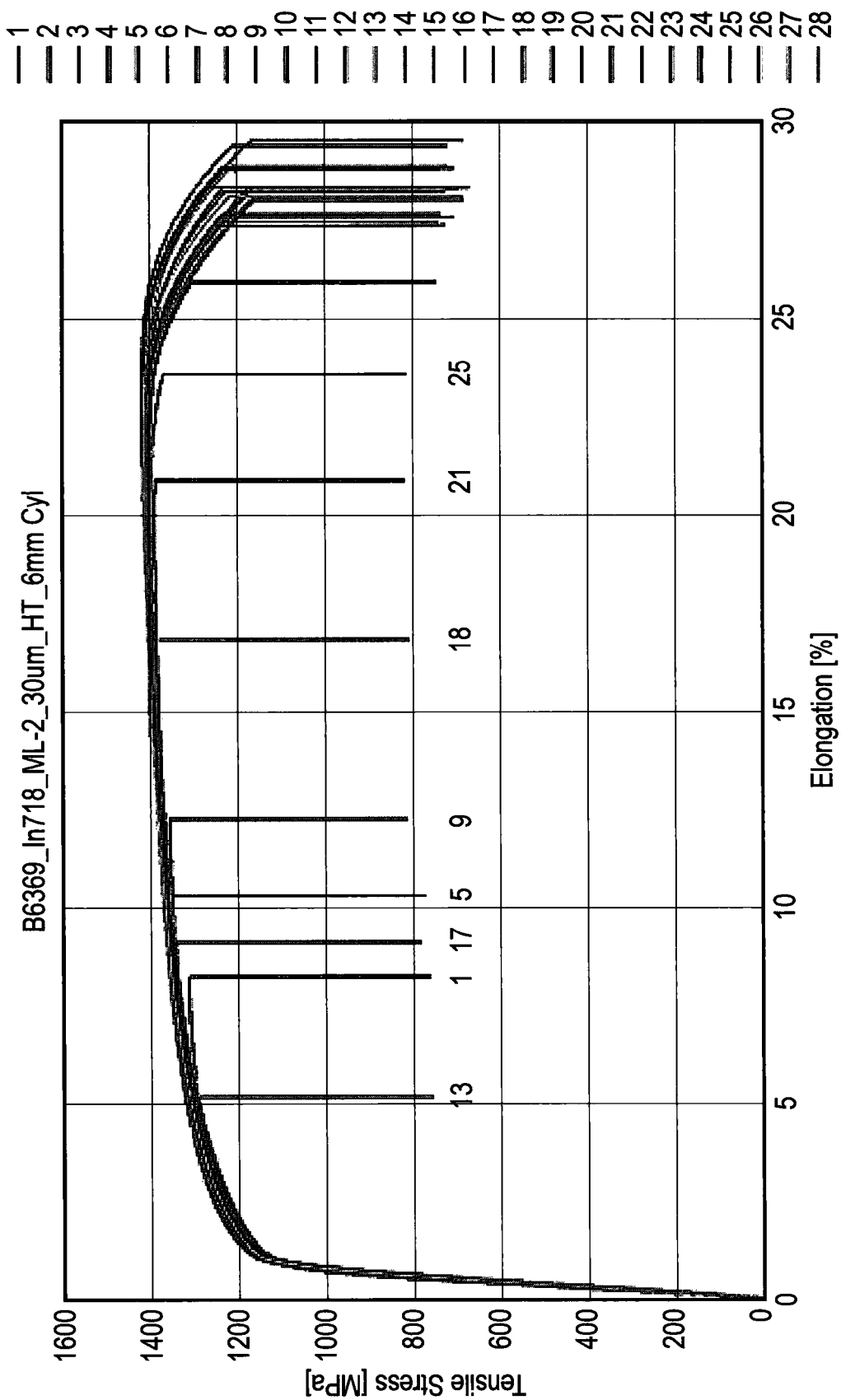
FIG. 18*a* shows measured mechanical properties of the test cylinders of the fourth experimental build.
Figure 18B:
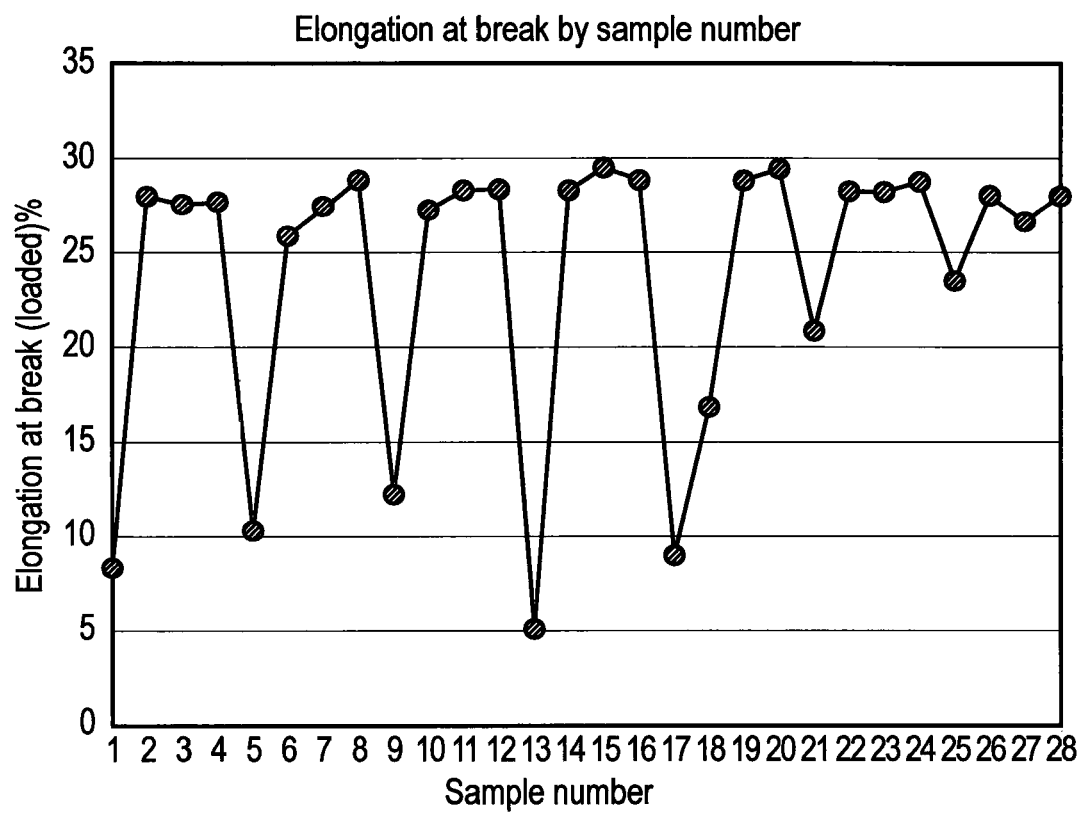
FIG. 18*b* is a plot of elongation at break versus sample number and FIG. 18*c* is a plot of elongation at break versus column number.
Figure 18C:
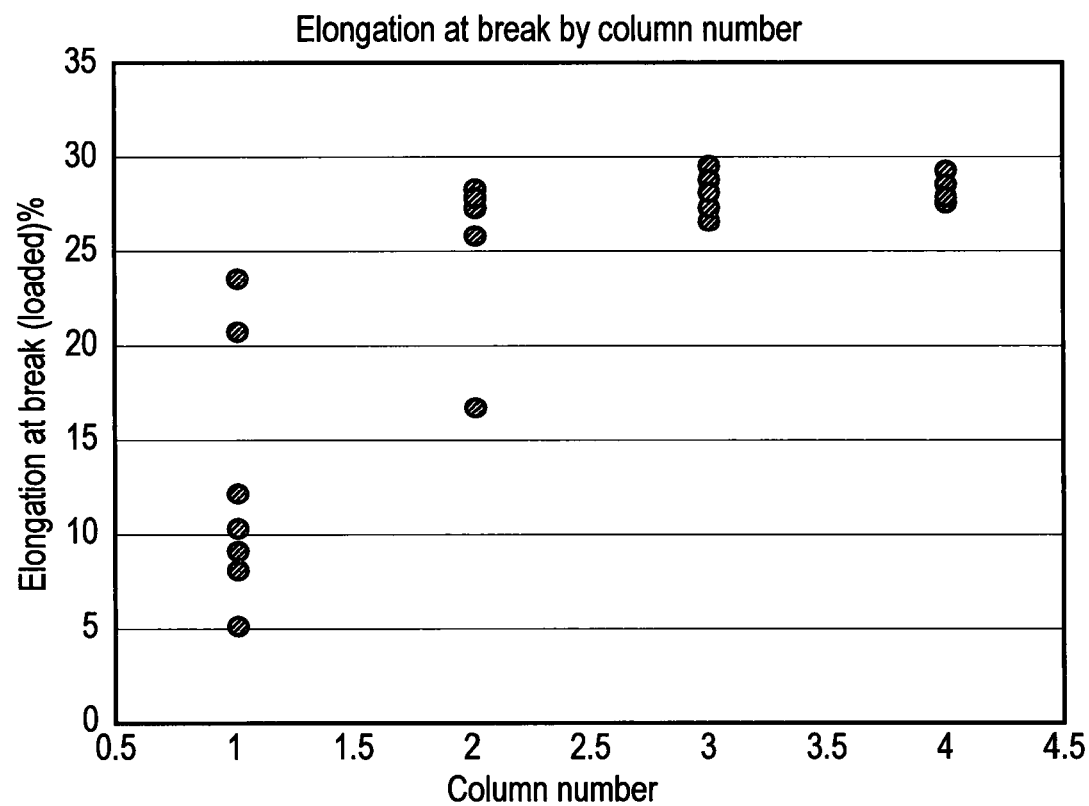

Referring to FIGS. 18a to 18c, the ductility of the test cylinders is similar to those of Example 2. The ductility of the downstream samples reduces and their elongation at break is more variable as the distance between the downstream sample and the upstream samples increases. The downstream test cylinders having a smaller spacing from the upstream samples tend to have improved tensile performance and the resultant mechanical properties become increasingly consistent.

Referring to FIG. 18a, the downstream test cylinders formed with three upwind laser beams are weaker than the rest of the population of test cylinders except for sample 18. As shown in FIGS. 18b and 18c, each row of specimens has a weaker downstream sample, although the effect is less marked as the downwind distance reduces.

Example 6

Figure 19A:
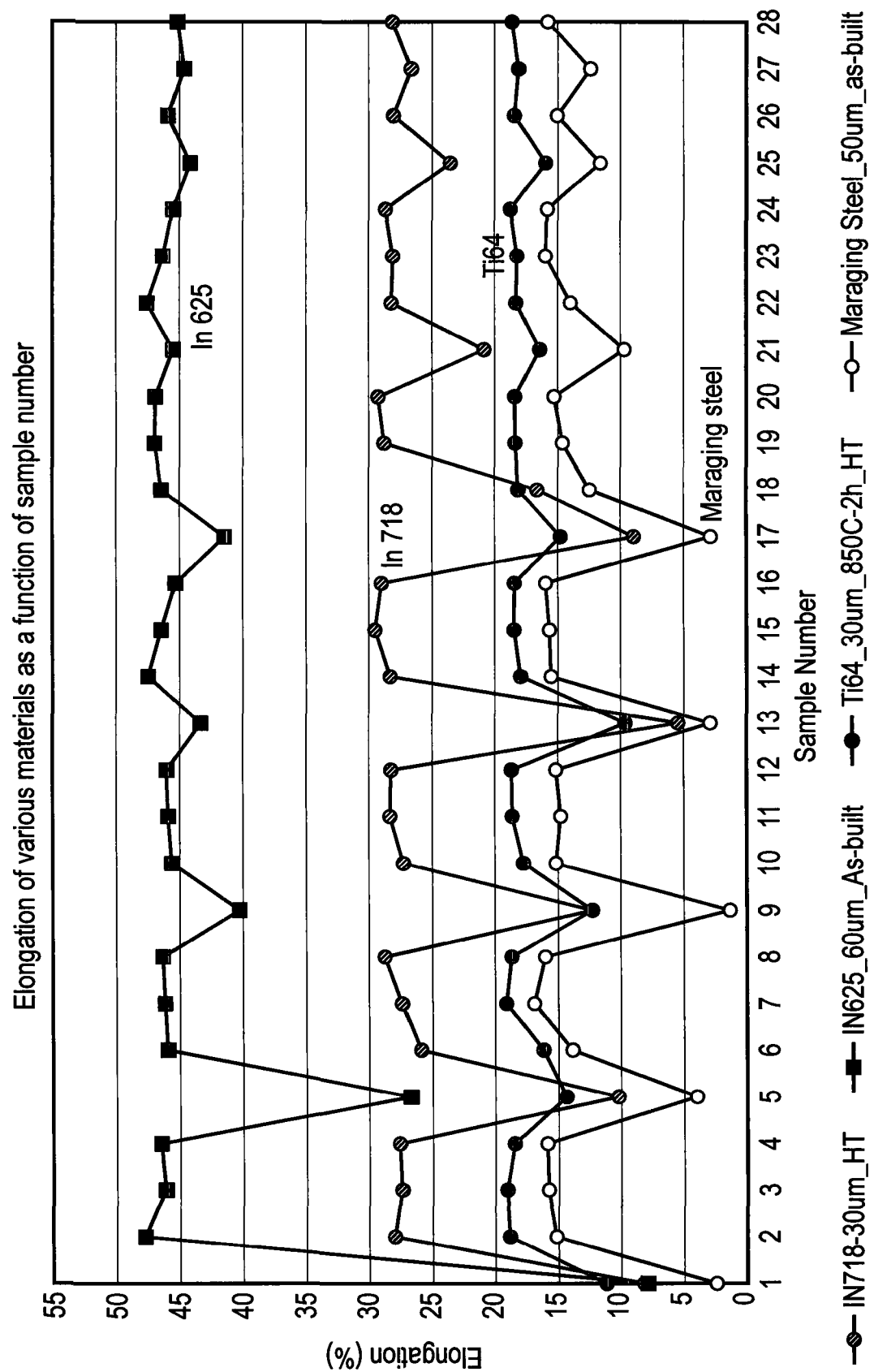
FIG. 19*a* shows a measured value for elongation at break versus sample number for test cylinders built with different materials in accordance with the fourth experimental build design and FIG. 19*b* is a plot showing the loss of ductility with downwind distance for the test cylinders built with each material.
Figure 19B:
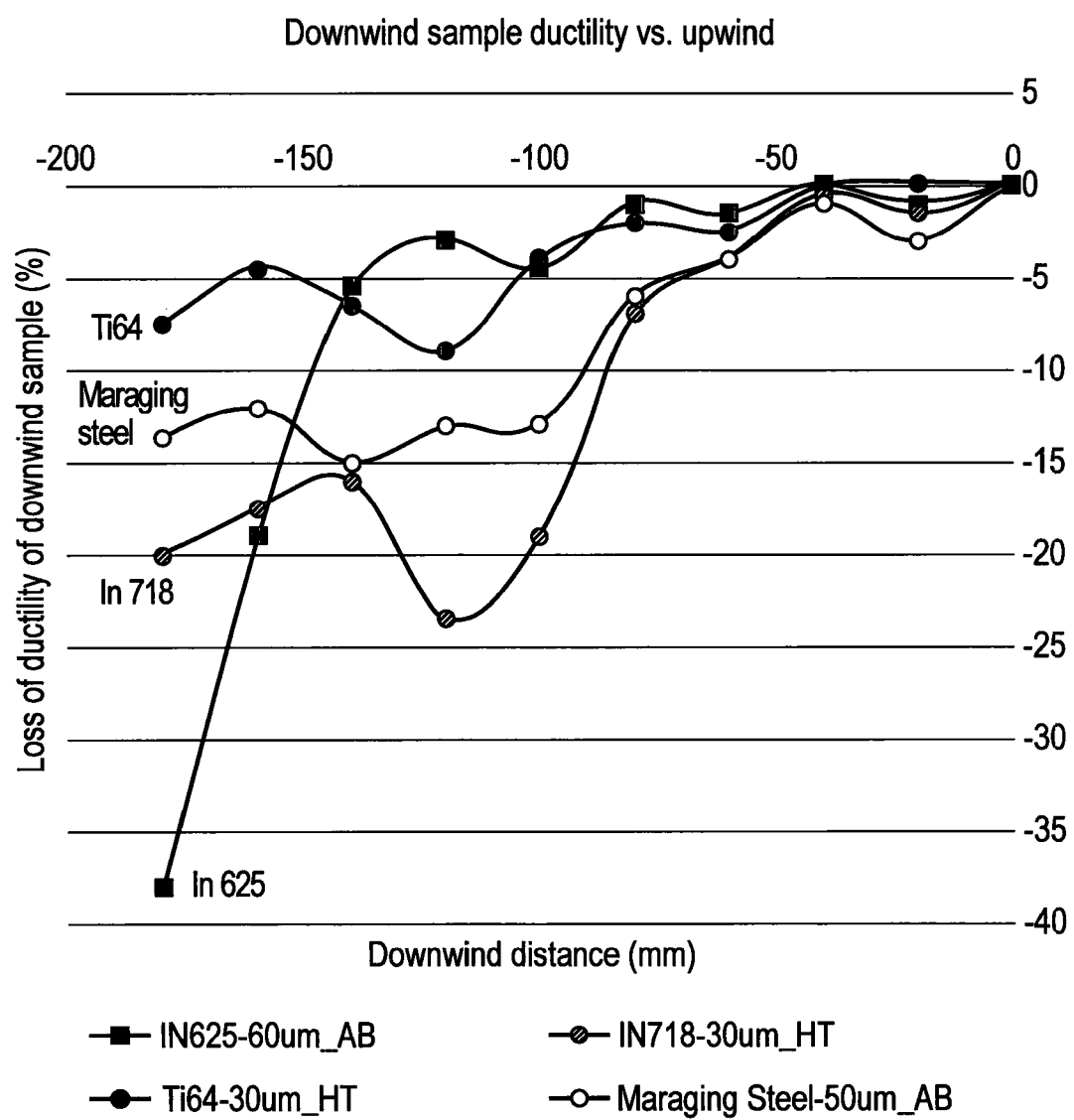
Figure 20A:
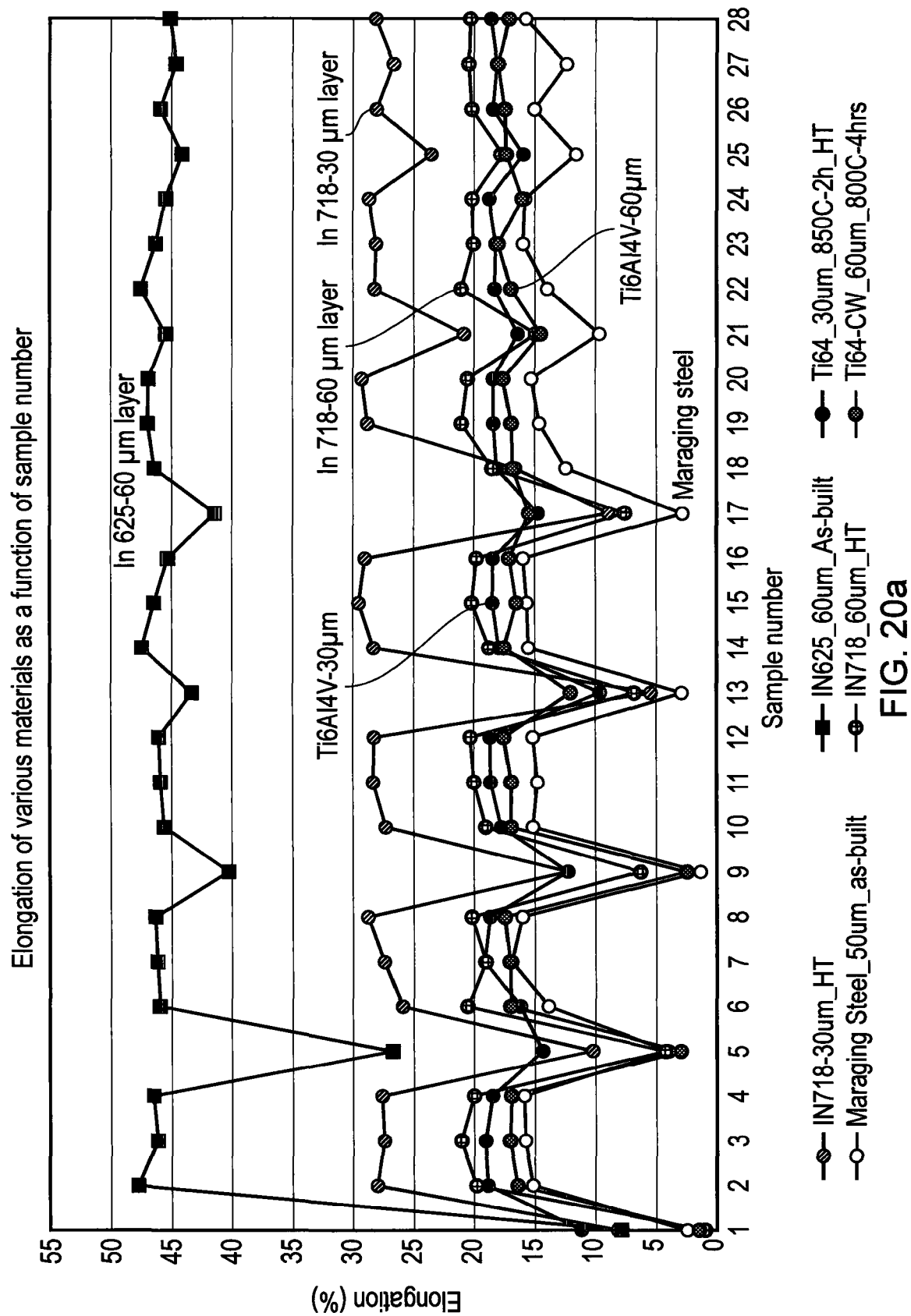
FIG. 20*a* shows a measured value for tensile strength versus sample number for the test cylinders built with each material and FIG. 20*b* is a plot showing the loss of ultimate tensile strength (UTS) with downwind distance for the test cylinders built with each material.
Figure 20B:
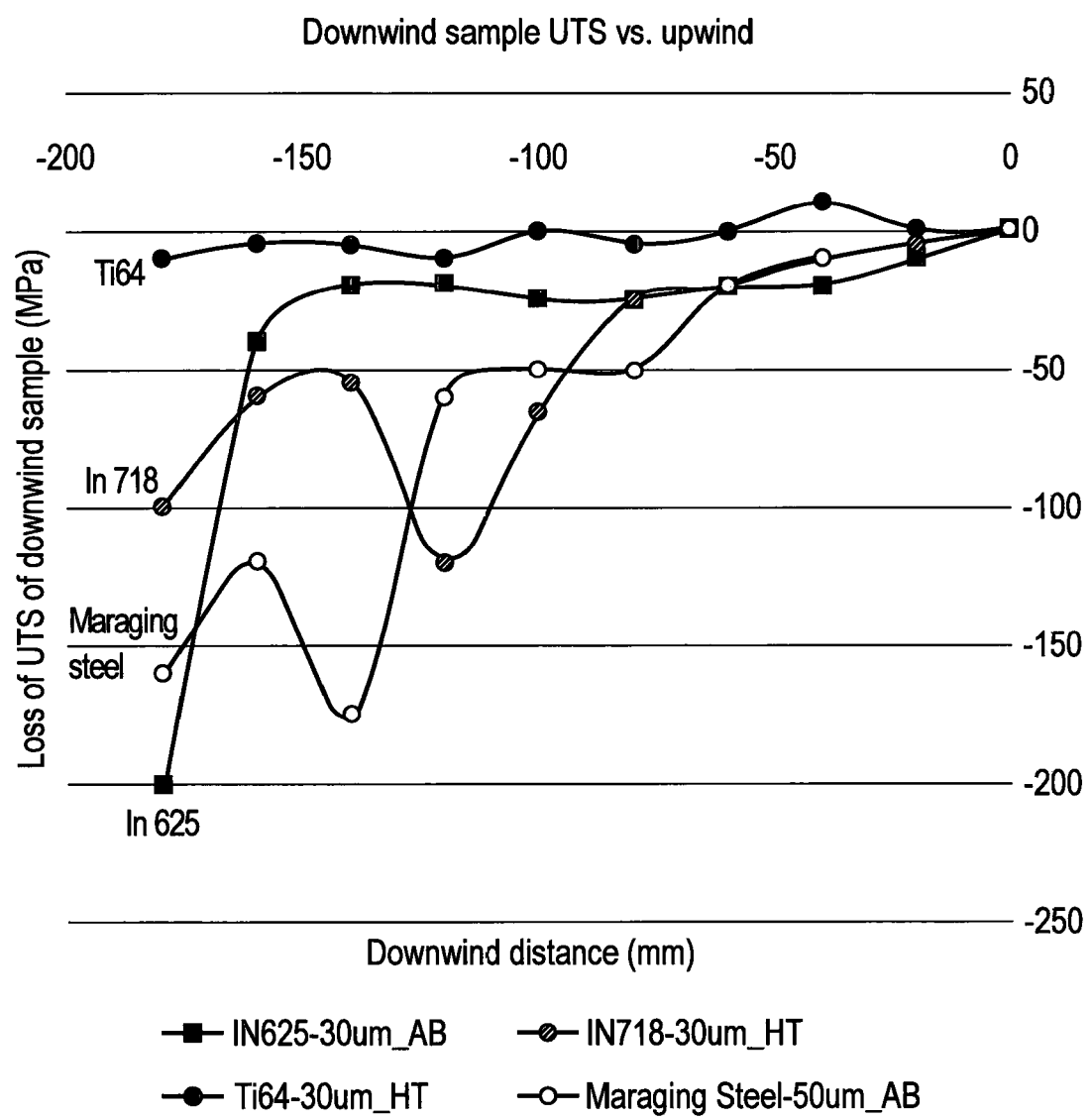

In a further experiment further test cylinders were built in the layout shown in FIGS. 14 and 16 in different materials, Inconel 718, Inconel 625, Ti6Al4V (Ti64) and Maraging steel. FIGS. 19a and 19b show a loss of ductility in the downstream samples for all the materials. However, as illustrated in FIG. 19b, the change in ductility with downwind distance varies between the materials. A drop off is also seen in the ultimate tensile strength (UTS) as illustrated in FIGS. 20a an 20b. The one exception is Ti6Al4V which, due to the shape of the stress-strain curve that peaks at low strain before tailing off towards fracture, requires a severe loss of ductility before the UTS is reduced.

It is believed that the variation in the relationship between mechanical properties and distance downwind between materials is due to the differing nature of their spatter production and tensile behaviour. However, it is clear that the greater the distance between upstream and downstream samples, the bigger the impact on material properties. If the lasers are kept within 60 mm or so, the impact is small, but the degradation increases markedly at larger laser point separations.

Example 7

Two sets of test cylinders were built in the build layout shown in FIGS. 14 and 16 in Inconel 178 and TiAl4V, wherein a first build of test cylinders used a layer thickness of 30 µm and a second build of test cylinders used a layer thickness of 60 µm. It is believed that varying the layer thickness affects an amount of spatter and condensate produced. Thicker layers require a higher energy input per layer, resulting in a larger melt pool, which is likely to produce more spatter. Higher laser power produces a more intense laser spot, and therefore a more vigorous vapour plume and more condensate. It might be expected, therefore, that downstream samples would be more severely affected for thicker layers. To offset this, the more powerful laser beam might be more effective at cutting through the gas-borne particulate material.

Figure 21A:
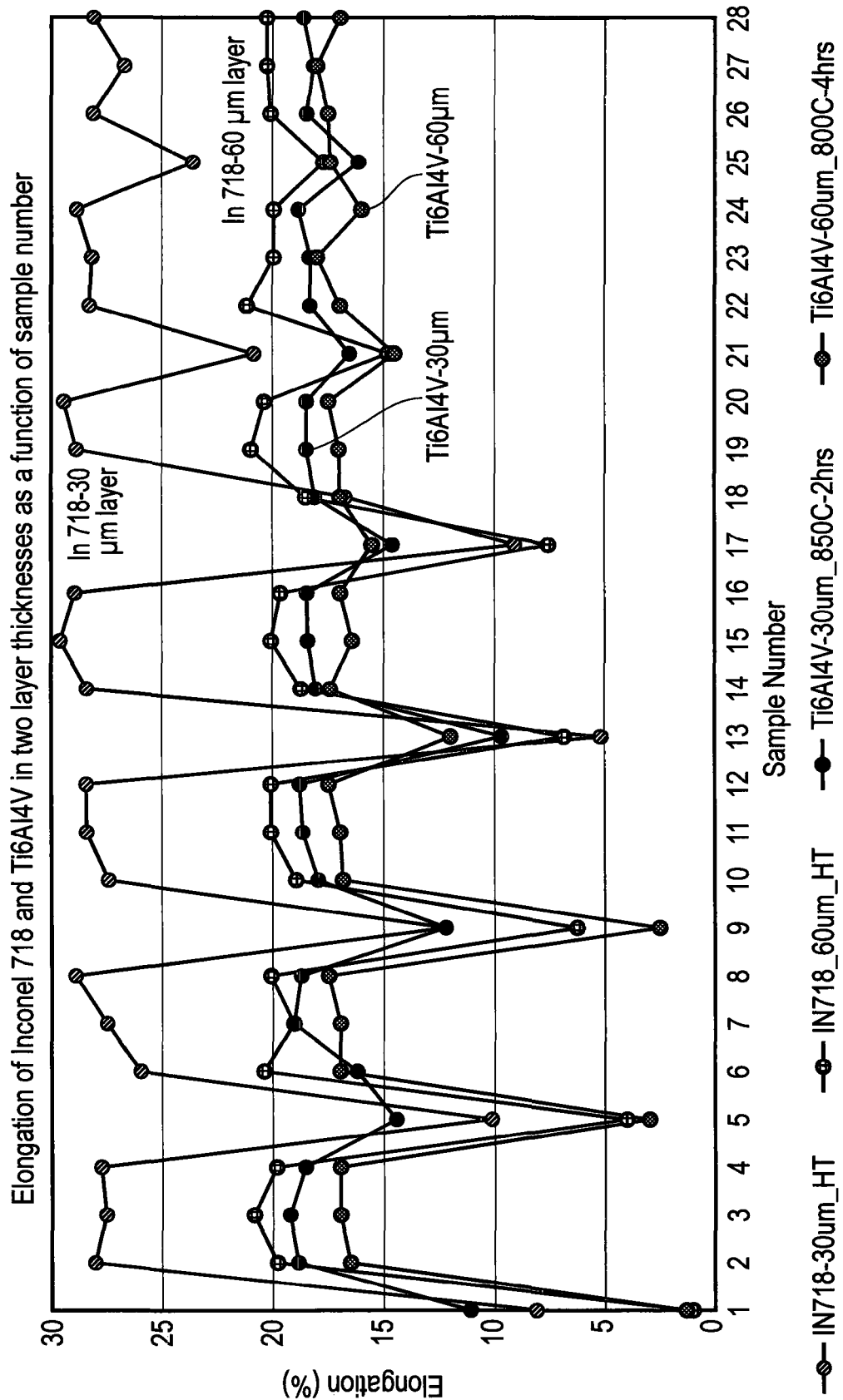
FIG. 21*a* shows a variation in elongation at break versus sample number for test cylinders built in accordance with the fourth experimental build design for layer thicknesses of 30 μm and 60 μm and FIG. 21*b* shows the loss of ductility for these test cylinders with downwind distance.
Figure 21B:
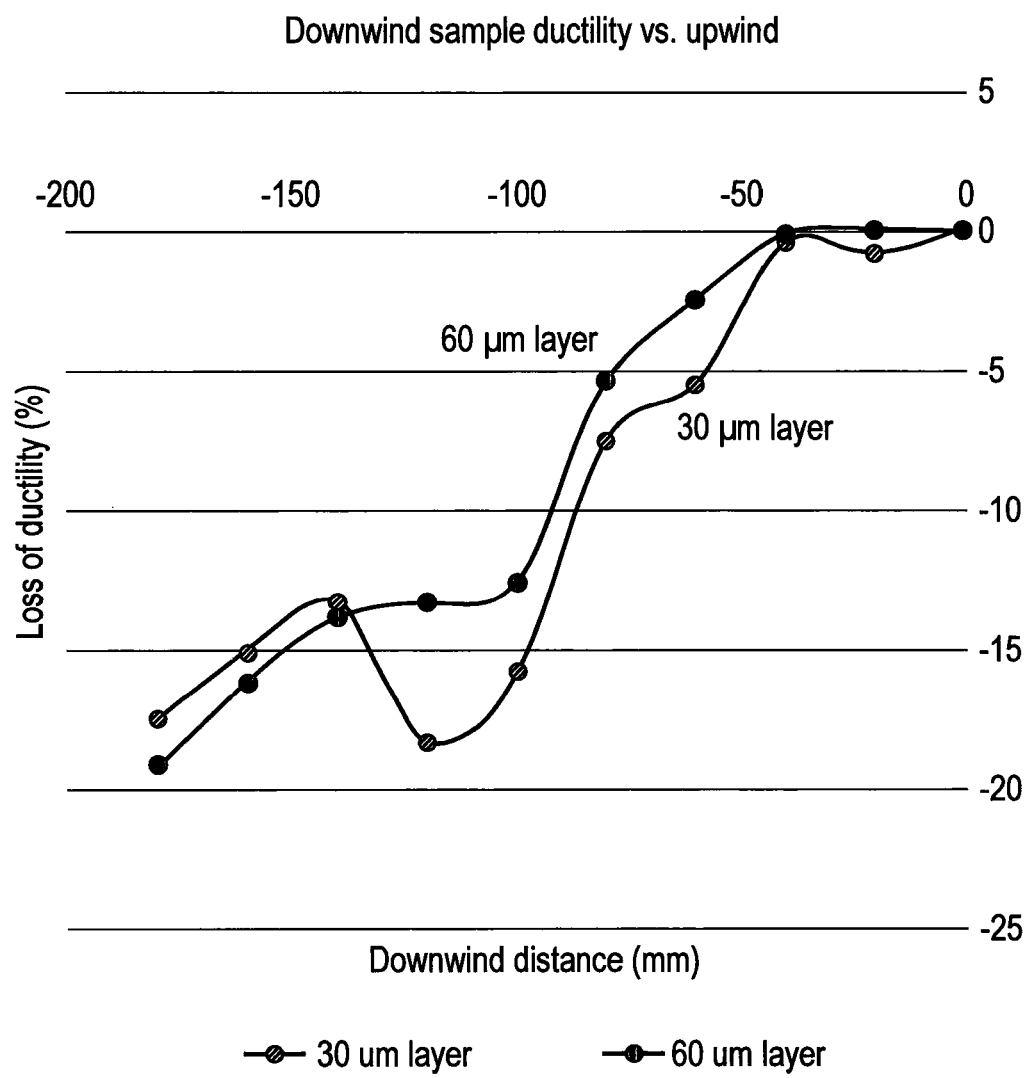

For heat-treated Inconel-718 and the TiAl4V, the results for two different layer thicknesses (30 µm and 60 µm) are similar as shown in FIGS. 21a and 21b. The same general pattern of distance-related degradation of mechanical properties as discussed in connection with the previous examples is seen.

Example 8

Figure 23A:
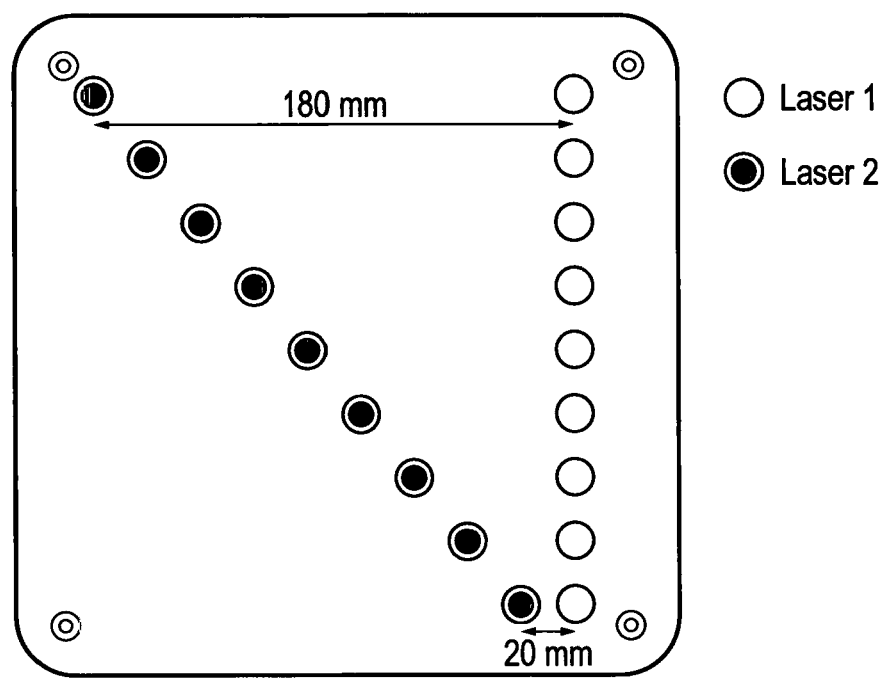
FIG. 23*a* is a plan view of the build layout for a fifth experimental design, wherein each downstream test cylinder is built together with only one upstream test cylinder.

In this experiment, two lasers were used to build pairs of test cylinders in rows, such that one is downstream of the other, with the distance between the test cylinders varying between rows. The build layout is shown in FIG. 23a.

The downstream samples in this experiment have a smoother surface than in the previous tests, with a worst case surface roughness of 6 µm with a single upstream laser, compared to 20 µm when three upstream lasers are used. There is still a noticeable degradation in the samples that are farthest downwind.

Figures 23B, 23C:
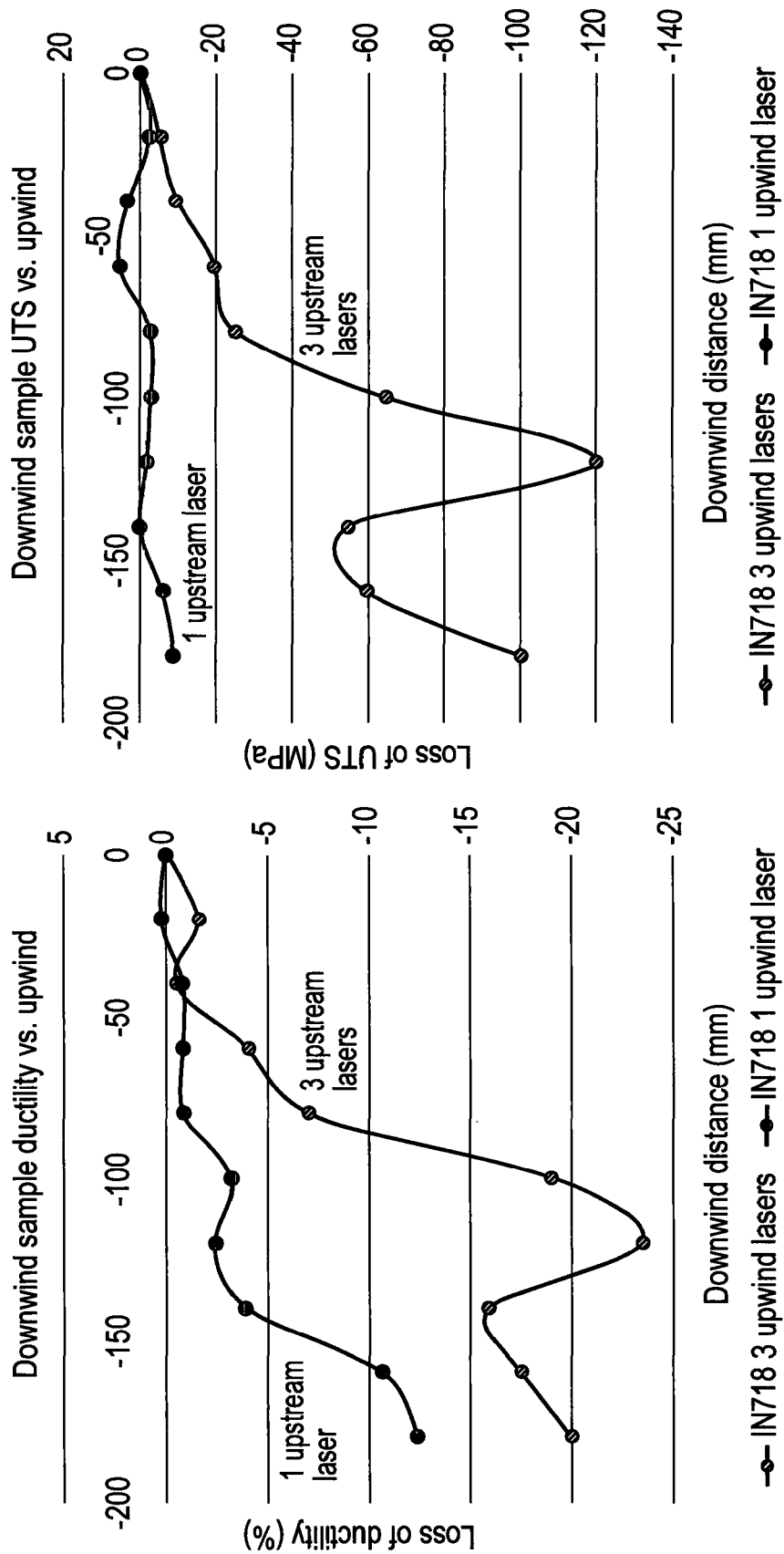
FIG. 23*b* is a plot showing the difference in the loss of ductility with downwind distance for test cylinders built with 3 upstream lasers in accordance with the fourth experimental design and test cylinders built with 1 upstream laser in accordance with the fifth experimental design and FIG. 23*c* is a plot showing loss of UTS with downwind distance for test cylinders built with 3 upstream lasers in accordance with the fourth experimental design and test cylinders built with 1 upstream laser in accordance with the fifth experimental design.

The tensile properties of downstream samples with only one upstream laser are also much closer to the baseline condition (FIG. 23c). Ductility is still affected in those specimens that are furthest downwind (FIG. 23b).

This reduction in the effect on downstream samples compared to the previous examples can be attributed to the fewer process emissions coming from a single upstream laser. The impact is, however, still noticeable. The conclusion is that processing a long distance downwind of a single laser is also to be avoided. However, the maximum allowable distance has increased under these conditions to around 100 mm.

Example 9

Figure 24A:
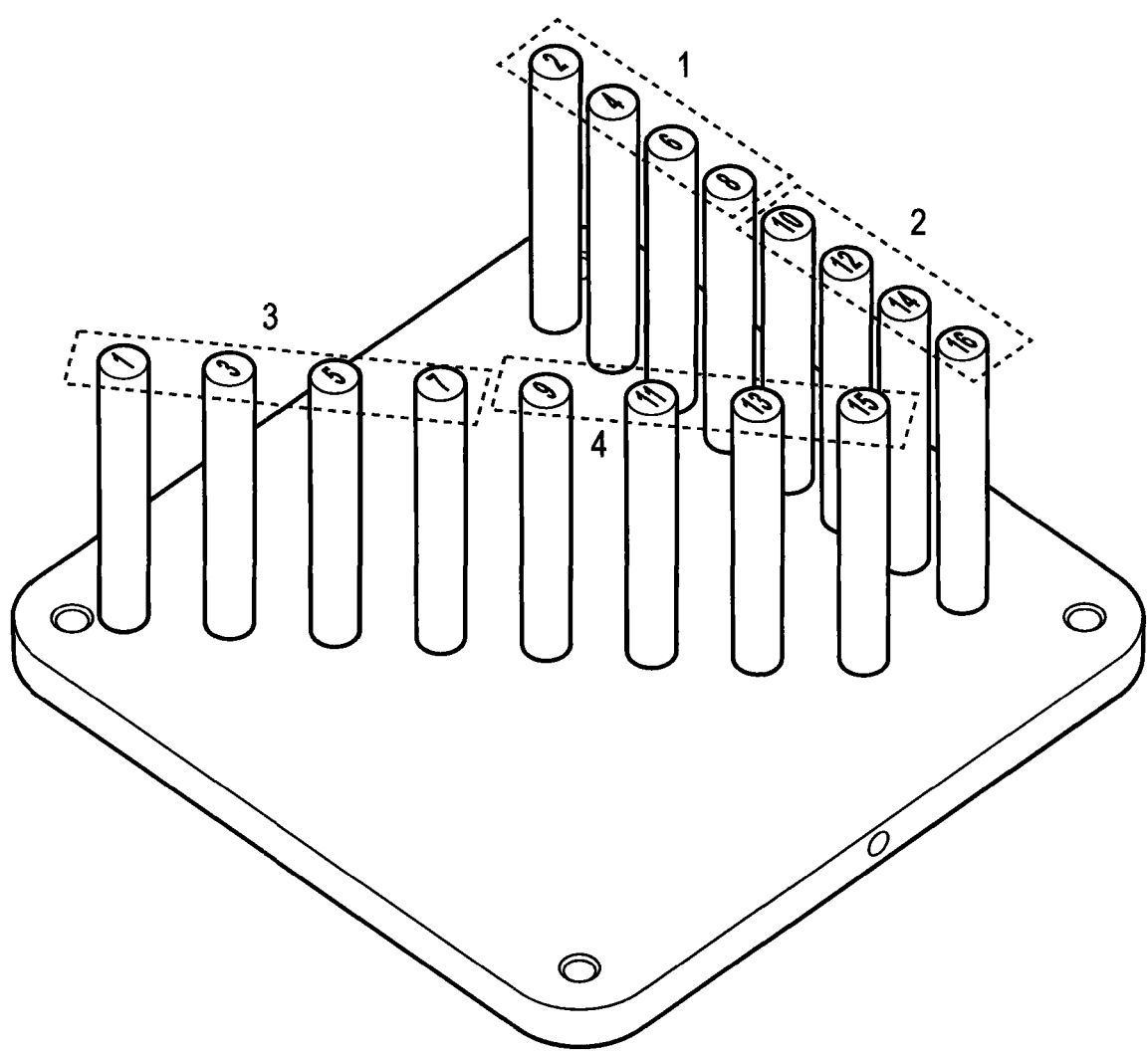
FIG. 24*a* is a perspective view of a build layout according to a sixth experimental design.
Figure 24C:
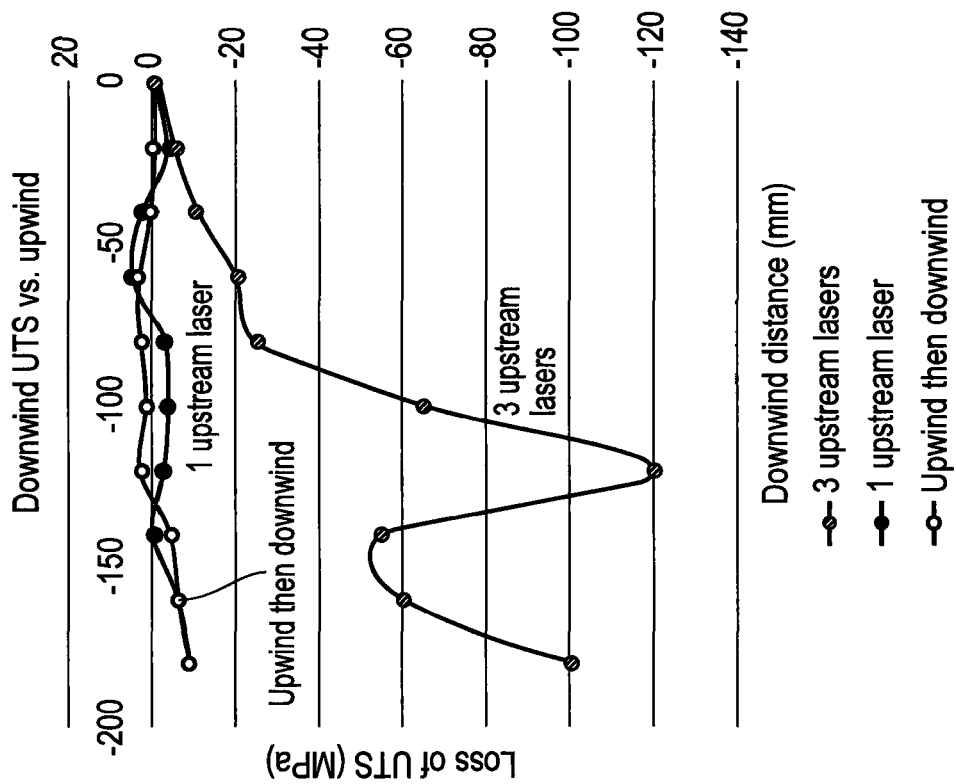
FIG. 24*b* is a plot showing the difference in the loss of ductility with downwind distance for test cylinders built in accordance with the sixth experimental design and FIG. 24*b* is a plot showing loss of UTS with downwind distance for test cylinders built in accordance with the sixth experimental design.
Figure 24B:
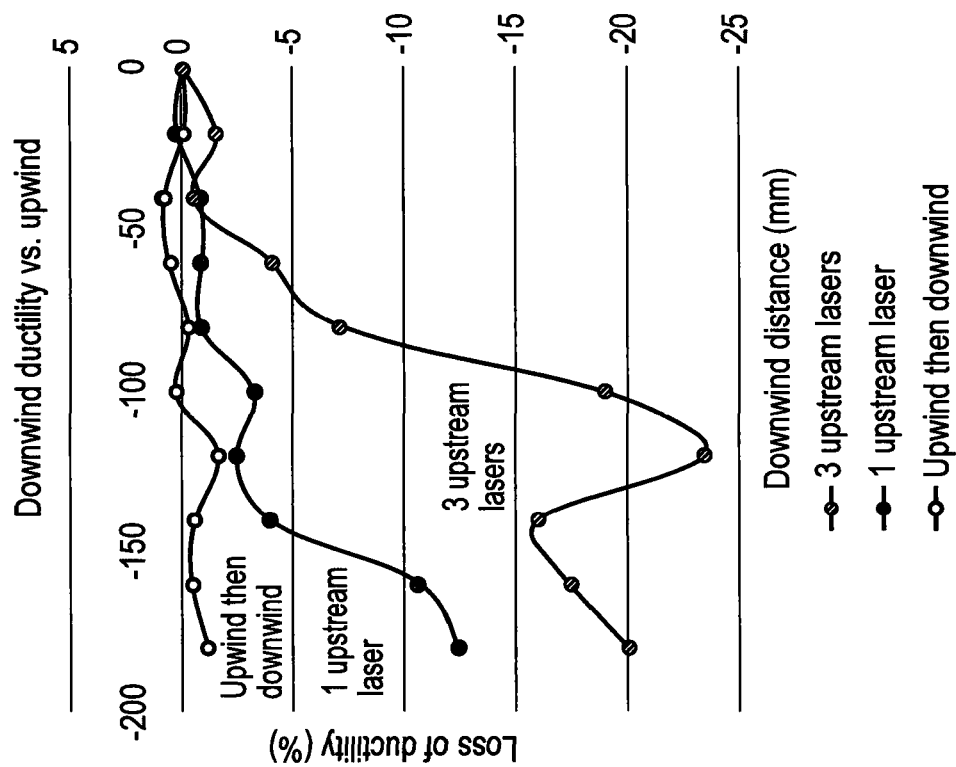

In the sixth experimental design, test cylinders were built in the layout shown in FIG. 24a. In each layer, the test cylinders of group 1 were built first, followed by group 2, then 3 and finally 4. The test cylinders of each group were processed simultaneously in each layer. In this way, in each layer, the upwind most cylinders of groups 1 and 2 were built before downwind cylinders of groups 3 and 4. This experiment was conducted to determine if the effects on the mechanical properties of the downwind test cylinders occurred due to debris, produced during the processing of the upwind test cylinders, falling on the bed. The results of these tests and the earlier tests, wherein the downwind test cylinders were simultaneously formed with 1 and 3 upwind lasers beams, are shown in FIGS. 24b and 24c. As can be seen, there is little difference between the mechanical properties of the upwind and downwind test cylinders built in accordance with the sixth experimental design. Accordingly, it is believed that debris falling onto the bed has little or no impact on the mechanical properties of the parts built in a multi-laser system and it is particles entrained in the gas flow that have a greater impact upon part quality of downwind parts.

Example 10

Figure 25A:
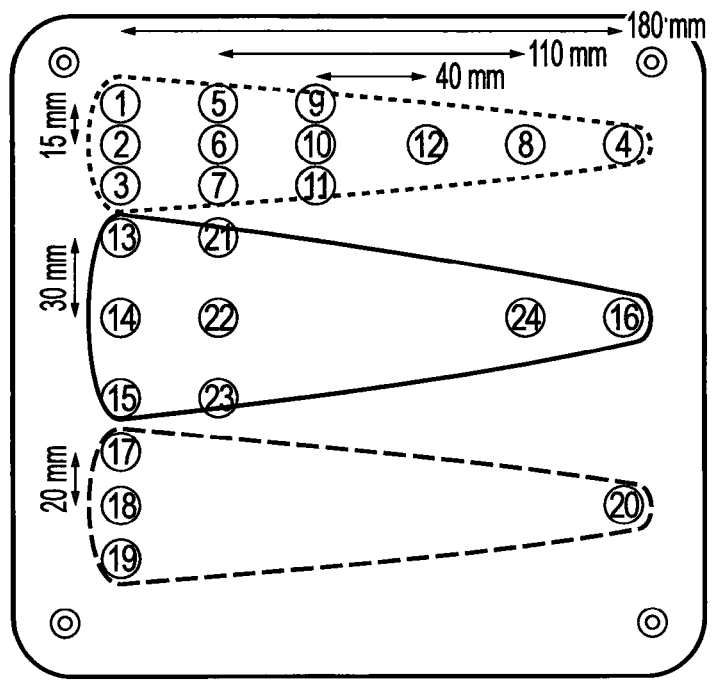
FIG. 25*a* is a plan view of the build layout for a seventh experimental design.
Figure 25B:
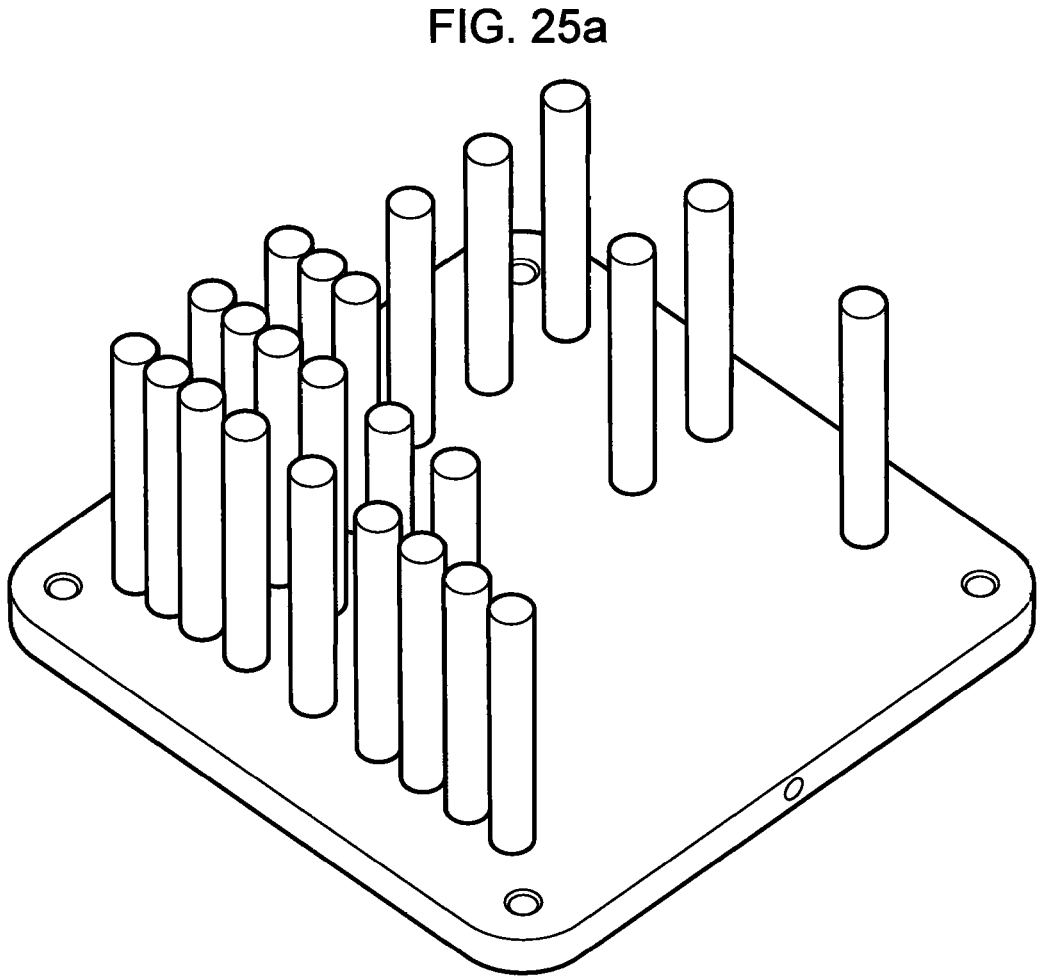
FIG. 25*b* is a perspective view of a build layout according to the seventh experimental design.

In the seventh experimental design, test cylinders were built in the layout shown in FIGS. 25a and 25b using TiAl4V. Groups of four test cylinders were built simultaneously in the following order: test cylinders 1, 2, 3 and 4, test cylinders 13, 14, 15 and 16, test cylinders 17, 18, 19 and 20, test cylinders 5, 6, 7 and 8, test cylinders 21, 22, 23 and 24 and test cylinders 9, 10, 11 and 12. For different ones of the groups, there was a different downwind distance (40 m, 110 mm, 180 mm) between the upwind test cylinder and the downwind test cylinders and, for each downwind distance, a different spacing (15 mm, 30 mm, 20 mm) perpendicular to the gas flow direction between the downwind test cylinders. FIG. 25c shows the results of measurements of various mechanical properties of the test cylinders.

FIG. 25d shows the measurement of elongation at break as a percentage relative to the elongation at break for the corresponding upstream test cylinder of the group versus X and Y displacement for the downstream test cylinders. FIG. 26e shows the same measurement versus X displacement and angle between the gas flow direction and a line joining each downstream test cylinder and the corresponding upstream test cylinder of the group (referred to as cone angle). The value used for zero displacement and zero angle in each plot is the worst value obtained for that X displacement.

As can be seen, as the cone angle increases, the elongation at break for the test cylinder improves. From this data, for TiAl4V, it may be determined that a cone angle of +/−10 degrees may provide a reasonable approximation of the gas-borne debris zone. From previous data disclosed in connection with the other Examples, a maximum separation distance of 60 mm for downstream points/areas within the gas-borne debris zone may be used for determining downstream points/areas that can be simultaneously melted. Other cone angles and other maximum separation distances may be used with other materials.

From the above examples, it can be determined that a location of a downstream part relative to upstream parts in the direction of gas flow has an impact on the solidification of the part.

It will be understood that alterations and modifications may be made to the invention without departing from the scope of the invention as defined herein. For example, it is believed that different gas flow regimes are likely to influence the maximum allowable distance for simultaneous processing of downwind points. Accordingly, different maximum allowable distances may be set for different machines.

The invention claimed is:

1. A method of selecting a scanning sequence for a plurality of laser beams in a selective laser solidification process, in which one or more objects are formed layer-by-layer by, repeatedly, depositing a layer of powder on a powder bed and scanning the plurality of laser beams over the deposited powder to selectively solidify the powder layers, where a gas flow is passed over the powder bed in a gas flow direction, the method comprising:

selecting a scanning sequence for the plurality of laser beams to include the simultaneous exposure of an upstream point together with a downstream point located downstream of a flow of debris carried from the upstream point by the gas flow, the downstream and upstream points selected for simultaneous exposure based upon the downstream point being within a maximum separation distance from the upstream point; and scanning the powder bed with the plurality of laser beams in accordance with the selected scanning sequence, wherein the downstream point is a point within a gas-borne debris zone across which gas-borne debris generated by the solidification of the upstream point is deemed to be carried by the gas flow in the gas flow direction.

2. A method according to claim 1, wherein the maximum separation distance is a function of at least one of a type of material being melted, hatch angle relative to the gas flow direction, laser power, scan speed, point distance and exposure time, laser spot size, an area of an upstream area being solidified, a number of upstream points that are simultaneously exposed to the laser beams, and an angle between a line joining the downstream and upstream points and the gas flow direction.

3. A method according to claim 1, wherein the selection of the scanning sequence is based upon the downstream point being outside of a prohibited region of gas-borne debris zone.

4. A method according to claim 3, wherein the prohibited region is a function of at least one of a location of the upstream point in the powder bed, a type of material being melted, laser power, scan speed, point distance and exposure time, laser spot size, an area of an upstream region to be solidified, a number of upstream points that are simultaneously exposed to the laser beams together the with downstream point, a distance between the downstream and upstream point, and an angle between a line joining the downstream and upstream points and the gas flow direction.

5. A method according to claim 1, wherein the scanning sequence is selected based upon, for each layer, at least one of relative locations of points to be exposed to the laser beams, relative locations of hatch lines or hatch line segments to be exposed to the laser beams, relative locations of stripes or stripe segments to be exposed to the laser beams, and relative locations of islands or island segments to be exposed to the laser beams.

6. A method according to claim 1, wherein the scanning sequence comprises a core scan for solidifying a core of an area to be solidified, the core scan comprising a plurality of hatch lines, and a border scan for solidifying a border of the area, the border scan having a path that follows a perimeter of the area and the method further comprises selecting points of the border scan for simultaneous exposure with points of the core scan such that downstream and upstream points selected for simultaneous exposure are within the maximum separation distance.

* * * * *